US012603488B2

(12) United States Patent
Pohl et al.

(10) Patent No.: US 12,603,488 B2
(45) Date of Patent: Apr. 14, 2026

(54) SYSTEM FOR MONITORING FIELD DEVICE

(71) Applicant: Beckhoff Automation GmbH, Verl (DE)

(72) Inventors: Christopher Pohl, Verl (DE); Thomas Rettig, Rheda-Widenbrück (DE); Benjamin Bruns, Celle (DE); Sebastian Petrović, Bünde (DE)

(73) Assignee: Beckhoff Automation GmbH, Verl (DE)

( * ) Notice: Subject to any disclaimer, the term of this patent is extended or adjusted under 35 U.S.C. 154(b) by 312 days.

(21) Appl. No.: 18/447,712

(22) Filed: Aug. 10, 2023

(65) Prior Publication Data

US 2023/0387674 A1 Nov. 30, 2023

Related U.S. Application Data

(63) Continuation of application No. PCT/EP2022/056253, filed on Mar. 10, 2022.

(30) Foreign Application Priority Data

Mar. 17, 2021 (DE) ...................... 10 2021 106 487.2

(51) Int. Cl.
*H02H 3/00* (2006.01)
*H02H 1/00* (2006.01)
(Continued)

(52) U.S. Cl.
CPC .......... *H02H 1/0015* (2013.01); *H02H 1/043* (2013.01); *H02H 3/08* (2013.01); *H02H 3/44* (2013.01)

(58) Field of Classification Search
CPC ........ H02H 1/0015; H02H 1/043; H02H 3/44; H02H 3/08
(Continued)

(56) References Cited

U.S. PATENT DOCUMENTS 6,751,076 B2 6/2004 Lytollis
7,876,544 B2 1/2011 Kessler et al.
(Continued)

FOREIGN PATENT DOCUMENTS

CN 201138445 Y 10/2008
CN 203278193 U 11/2013
(Continued)

OTHER PUBLICATIONS

Office Action dated May 10, 2024 in connection with Chinese patent application No. 202280016194.7, 7 pages including partial English translation.

(Continued)

*Primary Examiner* — Crystal L Hammond
*Assistant Examiner* — Lucy M Thomas
(74) *Attorney, Agent, or Firm* — Dorsey & Whitney LLP

(57) ABSTRACT

A system includes a plurality of field devices electrically connected to a feed-in device configured to provide an electrical energy supply to the field devices. The feed-in device has a monitoring device configured to detect spark generation in the energy supply and, based on this, to switch off the electrical energy supply. The field devices each have an input terminal for connecting a supply line. At least one field device is configured for electrical energy supply to at least one subsequent field device, and for monitoring. The monitoring field device has at least one output terminal for connecting a further supply line, via which the electrical energy can be forwarded to the subsequent field device. The monitoring field device has a monitoring device configured to detect spark generation in the energy supply to the subsequent field device and, based on this, to switch off the electrical energy supply.

16 Claims, 11 Drawing Sheets

(51) Int. Cl.

| | |
|---|---|
| *H02H 1/04* | (2006.01) |
| *H02H 3/08* | (2006.01) |
| *H02H 3/44* | (2006.01) |
| *H02H 7/00* | (2006.01) |

(58) Field of Classification Search

USPC ........................................................ 361/1

See application file for complete search history.

(56) References Cited

U.S. PATENT DOCUMENTS

| | | | |
|---|---|---|---|
| 8,242,901 | B2 | 8/2012 | Indefrey et al. |
| 9,893,605 | B2 | 2/2018 | Marks |
| 10,333,640 | B2 | 6/2019 | Pohl et al. |
| 10,566,782 | B2 | 2/2020 | Pohl et al. |
| 10,567,191 | B2 | 2/2020 | Pohl et al. |
| 10,790,622 | B2 | 9/2020 | Pohl et al. |
| 11,050,243 | B2 | 6/2021 | Walther et al. |
| 2008/0224850 | A1* | 9/2008 | Indefrey ................ H02H 9/008 |
| | | | 340/532 |
| 2021/0001733 | A1 | 1/2021 | Meins et al. |
| 2022/0173588 | A1* | 6/2022 | Gajanayake ........... H02H 1/043 |

FOREIGN PATENT DOCUMENTS

| | | | |
|---|---|---|---|
| CN | 104795736 A | 7/2015 | |
| CN | 105373176 A | 3/2016 | |
| CN | 111801245 A | 10/2020 | |
| DE | 10249846 A1 | 5/2004 | |
| DE | 10328532 B3 | 12/2004 | |
| DE | 102004055053 A1 | 5/2006 | |
| DE | 10132415 B4 | 4/2008 | |
| DE | 102014117179 A1 | 5/2016 | |
| DE | 102015105702 B3 | 8/2016 | |
| DE | 102016105747 A1 | 10/2017 | |
| DE | 102016109450 A1 | 11/2017 | |
| DE | 102016110641 B3 | 11/2017 | |
| DE | 102016112362 A1 | 1/2018 | |
| DE | 102017116385 B3 | 10/2018 | |
| EP | 2174425 A1 | 4/2010 | |
| EP | 1965482 B1 | 6/2010 | |
| EP | 1787374 B1 | 11/2011 | |
| EP | 2784977 A1 | 10/2014 | |
| EP | 3695475 A1 | 8/2020 | |

OTHER PUBLICATIONS

"Explosive Atmospheres: Part 39: Intrinsically safe systems with electronically controlled spark duration limitation," BSI Standards Publication, Jun. 20, 2015.

International Search Report and Written Opinion dated Jul. 7, 2022 in connection with International Patent Application No. PCT/EP2022/056253, 15 pages including English translation.

Liebers, Lutz. "DART—Dynamic Arc Recognition and Termination Intrinsic Safety without the Power Limits," SICE Annual Conf, Sep. 13-18, 2011, Japan.

Office Action dated Dec. 17, 2021 in connection with German patent application No. 10 2021 106 487.2, 6 pages including English translation.

International Preliminary Report on Patentability dated Feb. 23, 2023 in connection with International Patent Application No. PCT/EP2022/056253, 31 pages including English translation.

"Dart (Dynamic Arc Recognition and Termination) or—The new dimension of intrinsic safety," 2008, PTB and Pe+Fu proposal for article in atp issue 3, 30 pages including English translation.

* cited by examiner

SYSTEM FOR MONITORING FIELD DEVICE

CROSS REFERENCE TO RELATED APPLICATIONS

This patent application is a continuation of International Patent Application No. PCT/EP2022/056253, SYSTEM AND MONITORING FIELD DEVICE, filed 10 Mar. 2022, which claims the priority of German patent application DE 10 2021 106 487.2, SYSTEM UND ÜBERWACHUNGS-FELDGERÄT, filed 17 Mar. 2021, each of which is incorporated by reference herein, in the entirety and for all purposes.

FIELD

The present invention relates to a system comprising a feed-in device and a plurality of field devices electrically connected to the feed-in device.

BACKGROUND

An automation system may comprise a plurality of sensors and actuators. A feed-in device electrically connected to such components may be used for the electrical energy supply. The feed-in device may also be configured to carry out data communication with the components or to control the components.

In a possible case of use, components of the system are located in one or a plurality of potentially explosive atmospheres, for example in a zone 0/20 or zone 1/21 according to the ATEX directive (Atmospheres Explosibles). This makes it necessary to provide suitable protective measures to meet the explosion protection requirements. For this purpose, appropriate embodiments or design principles, also referred to as "ignition protection type", may be used for components of the system of the ATEX directive.

The PD IEC/TS 60079-39:2015 standard "Explosive atmospheres—Part 39: Intrinsically safe systems with electronically controlled spark duration limitation" describes a system comprising at least one field device (power-i field device) and a feed-in source (power-i source) electrically connected to the field device. The feed-in source is used to supply electrical energy to the field device and is also used to monitor the electrical energy supply. For this purpose, the feed-in source is configured to detect a spark generation in the electrical energy supply in order to switch off the energy supply on this basis.

In a system constructed in accordance with the above standard, the transmittable electrical power is determined by the system response time. The response time comprises delays, which may be caused by the length of the wiring used for electrical connection, capacitive and/or inductive effects, and spark detection and shutdown. The larger the distance and the slower the detection or shutdown, the smaller the maximum transmittable electrical power. Depending on the embodiment of the system, parameters such as line lengths, capacitive and/or inductive effects may be associated with such limitations that the concept described above cannot be applied. This case may e.g. occur if, as is common in process technology, line lengths in the range of up to 1000 m are provided.

SUMMARY

The present invention provides an improved system.

According to a first aspect, a system is proposed. The system comprises a feed-in device and a plurality of field devices electrically connected to the feed-in device. The feed-in device is configured to provide an electrical energy for electrical energy supply to the field devices. The feed-in device comprises a feed-in device monitoring device configured to detect spark generation in the electrical energy supply and, based on this, to switch off the electrical energy supply. The field devices each comprise an input terminal for connecting a supply line, via which the electrical energy provided by the feed-in device may be supplied to the respective field device.

At least one field device comprises a terminal device for connecting at least one output line, via which the electrical energy may be forwarded for electrical energy supply to at least one field component. At least one field device is a monitoring field device configured for electrical energy supply to at least one subsequent field device and for monitoring. The monitoring field device comprises at least one output terminal for connecting a further supply line, via which the electrical energy may be forwarded for electrical energy supply to at least one subsequent field device. The monitoring field device comprises a monitoring device configured to detect spark generation in the electrical energy supply to at least one subsequent field device and, based on this, to switch off the electrical energy supply.

Examples

According to a second aspect, a system is proposed. The system comprises a feed-in device and a plurality of field devices electrically connected to the feed-in device. The feed-in device is configured to provide an electrical energy for electrical energy supply to the field devices.

The feed-in device comprises a feed-in device monitoring device configured to detect spark generation in the electrical energy supply and, based on this, to switch off the electrical energy supply. The field devices each comprise an input terminal for connecting a supply line, via which the electrical energy provided by the feed-in device may be supplied to the respective field device. At least one field device is a monitoring field device configured for electrical energy supply to at least one subsequent field device and for monitoring. The monitoring field device comprises at least one output terminal for connecting a further supply line, via which the electrical energy may be forwarded for electrical energy supply to at least one subsequent field device. The monitoring field device comprises a monitoring device configured to detect spark generation in the electrical energy supply to at least one subsequent field device and, based on this, to switch off the electrical energy supply.

The field devices comprise a decoupling device configured to provide a predetermined input impedance for detecting the spark generation. The decoupling device of a field device is connected to the input terminal of the field device and is arranged downstream thereof. During operation of the system, different system sections of the system are monitored with the aid of the feed-in device and the at least one monitoring field device. The decoupling device of the at least one monitoring field device is arranged upstream of the monitoring device of the monitoring field device and serves as a termination impedance of a system section of the system which is monitored by the feed-in device or by a further monitoring field device arranged upstream of the monitoring field device.

According to a third aspect, a system is proposed. The system comprises a feed-in device and a plurality of field devices electrically connected to the feed-in device. The feed-in device is configured to provide an electrical energy for electrical energy supply to the field devices. The feed-in device comprises a feed-in device monitoring device configured to detect spark generation in the electrical energy supply and, based on this, to switch off the electrical energy supply. The field devices each comprise an input terminal for connecting a supply line, via which the electrical energy provided by the feed-in device may be supplied to the respective field device.

At least one field device comprises a terminal device for connecting at least one output line, via which the electrical energy may be forwarded for electrical energy supply to at least one field component. At least one field device is a monitoring field device configured for electrical energy supply to at least one subsequent field device and for monitoring. The monitoring field device comprises at least one output terminal for connecting a further supply line, via which the electrical energy may be forwarded for electrical energy supply to at least one subsequent field device. The monitoring field device comprises a monitoring device configured to detect spark generation in the electrical energy supply to at least one subsequent field device and, based on this, to switch off the electrical energy supply.

The field devices comprise a decoupling device, which comprises an LC low-pass filter having an inductor and at least one capacitor, so that a predetermined input impedance of the field devices is provided for detecting the spark generation. The decoupling device of a field device is connected to the input terminal of the field device and is arranged downstream thereof. During operation of the system, different system sections of the system are monitored with the aid of the feed-in device and the at least one monitoring field device. The decoupling device of the at least one monitoring field device is arranged upstream of the monitoring device of the monitoring field device and serves as a termination impedance of a system section of the system which is monitored by the feed-in device or by a further monitoring field device arranged upstream of the monitoring field device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
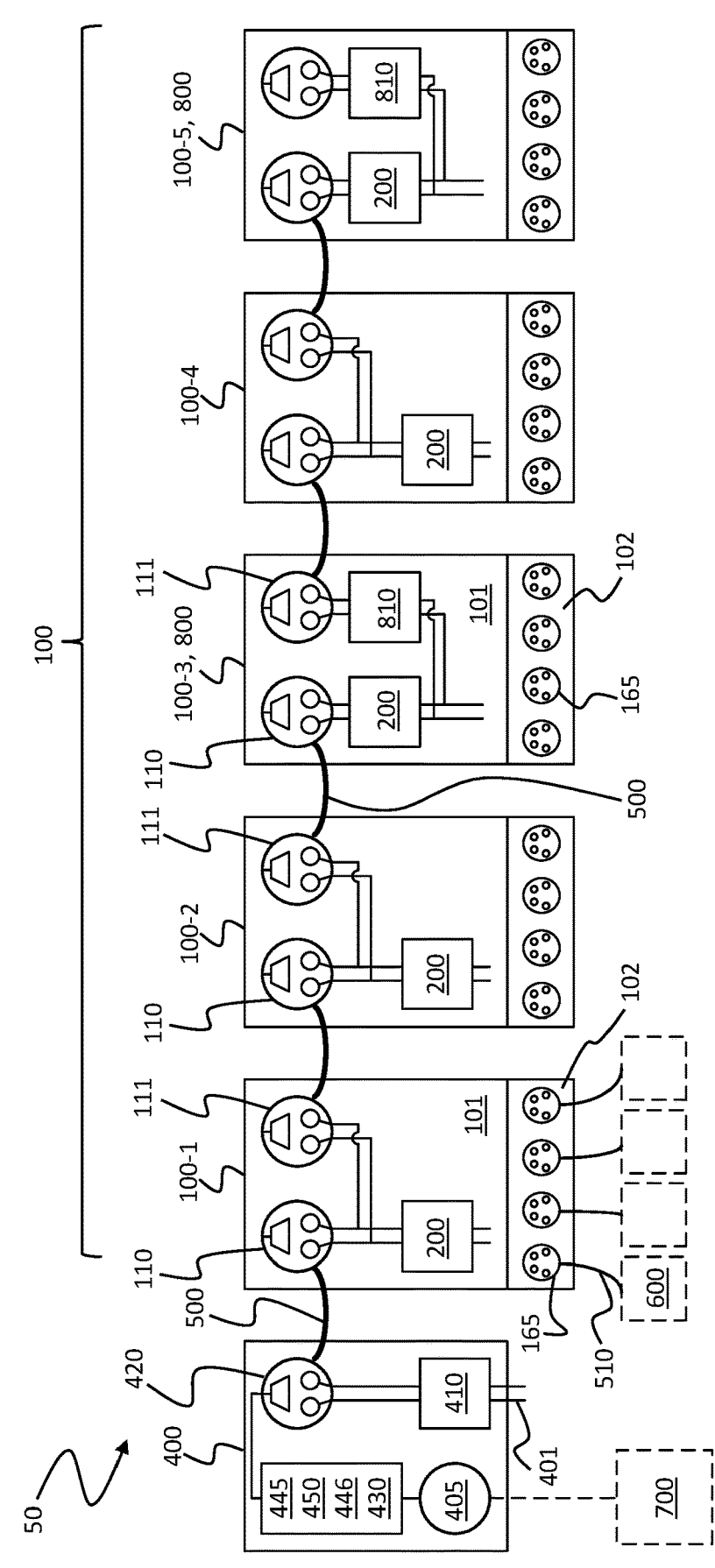
FIG. 1 shows a system comprising a feed-in device, a plurality of field devices, and a plurality of field components.

The examples described in the following relate to an improved system that may be used to electrically supply field components such as actuators and sensors that may be located in a hazardous area.

A system is proposed that comprises a feed-in device and a plurality of field devices electrically connected to the feed-in device. The feed-in device is configured to provide an electrical energy for electrical energy supply to the field devices. The feed-in device comprises a feed-in device monitoring device which is configured to detect spark generation in the electrical energy supply and to switch off the electrical energy supply on this basis. The field devices each comprise an input terminal for connecting a supply line, via which the electrical energy provided by the feed-in device may be supplied to the respective field device.

At least one field device comprises a terminal device for connecting at least one output line, via which the electrical energy may be forwarded for electrical energy supply to at least one field component. Furthermore, at least one field device is a monitoring field device, which is configured for electrical energy supply to at least one subsequent field device and for monitoring purposes. The monitoring field device comprises at least one output terminal for connecting a further supply line, via which the electrical energy may be forwarded for electrical energy supply to at least one subsequent field device. The monitoring field device further comprises a monitoring device which is configured to detect spark generation in the electrical energy supply to at least one subsequent field device and, based on this, to switch off the electrical energy supply.

The field devices of the proposed system comprise an input terminal for connecting a supply line. Via the input terminal and a supply line connected thereto, the electrical energy provided by the feed-in device of the system may be introduced into the field devices. At least one field device of the system comprises a terminal device for connecting at least one output line. In this way, the electrical energy provided to the field device may be forwarded to a field component connected to the output line to provide electrical energy thereto. The field component may be a device or an external device, respectively, such as a sensor or actuator. A plurality of field components may be connected to the terminal device via a plurality of output lines, thereby providing energy to the field component. Furthermore, a plurality of or all field devices of the system may each comprise a corresponding terminal device to which one or a plurality of field components may be connected for electrical energy supply.

In addition to providing the electrical energy, the feed-in device of the system is used to monitor the electrical energy supply. The monitoring may relate, inter alia, to at least one field device downstream of the feed-in device. For the purpose of monitoring, the feed-in device comprises a feed-in device monitoring device. With the aid of the feed-in device monitoring device, a spark or arc occurring during the electrical energy supply due to a fault may be detected in its generation and, based on this, the electrical energy supply may be switched off with a low latency in order to terminate the spark.

In the proposed system, monitoring is not only carried out by the feed-in device, as at least one field device of the system is configured as of a monitoring field device, which may be used to supply electrical energy to at least one subsequent field device by forwarding the electrical energy and for monitoring. The monitoring field device comprises at least one output terminal for connecting a further supply line, via which the electrical energy supplied to the monitoring field device may be forwarded for the electrical energy supply of at least one downstream field device.

It is possible that not only the at least one monitoring field device, but further or a plurality of or also all field devices of the system comprise at least one output terminal in addition to the input terminal. The at least one output terminal of a field device may be electrically connected to the associated input terminal. In this context, a supply line connected to an output terminal of a field device may be connected to an input terminal of a further or downstream field device, so that the electrical energy may be forwarded from one field device to the downstream field device for the purpose of energy supply.

For the purpose of monitoring, the at least one monitoring field device of the system, corresponding to the feed-in device, comprises a monitoring device. With the aid of the monitoring device of the monitoring field device, a spark or arc occurring in the electrical energy supply of at least one subsequent field device due to a fault may be detected in its generation and, based on this, the electrical energy supply may be switched off with a low latency in order to terminate the spark.

During operation of the system, a spark duration limitation may be achieved using the feed-in device and the at least one monitoring field device. This may reliably prevent a spark or ignition spark with sufficient energy for ignition from being generated in the area of the input and output terminals of the field devices and in the area of the supply lines connected to the field devices in the event of a fault.

Thus, in the proposed system, monitoring of the electrical energy supply is not carried out by the feed-in device alone, but additionally by the at least one monitoring field device. In this way, the monitoring may be carried out in a divided or segmented form and distributed over a plurality of sections of the system. In this context, individual or different system sections may be monitored with the help of the feed-in device and the at least one monitoring field device. A first system section may be monitored by the feed-in device, and one or a plurality of monitoring field devices subsequent to or downstream of the feed-in device may monitor a further system section or further system sections of the system.

Monitoring may refer to the input and output terminals of the field devices and supply lines located in the respective system sections. Due to the monitoring realized section by section, parameters such as line lengths of supply lines, capacitive and/or inductive effects and restrictions associated therewith may only relate to the individual or individually monitored system sections, and not to the system as a whole. As a result, an embodiment with relatively long line lengths and/or numbers of field devices may be considered for the system, and reliable monitoring of the energy supply may also be ensured in such an embodiment. An extension of the system may generally be limited by the available energy at the first system section monitored by the feed-in device, rather than by an overall length of the system.

Due to the aforementioned properties, the following scenario of use may be considered for the system, for example. The field devices may be located in a potentially explosive area (e.g. zone 1/21 according to the ATEX directive). The feed-in device may be located in a non-hazardous or low-hazardous area (e.g. zone 2/22 according to the ATEX Directive). For field components (sensor and/or actuator components), which may be connected to one or a plurality of field devices via output lines, an arrangement in a more potentially explosive area (e.g. zone 0/20 according to the ATEX directive) may be considered. In order to realize this scenario of use, in addition to the monitoring achieved with the aid of the feed-in device and the at least one monitoring field device, further measures and embodiments may be used, as will be described in more detail below.

Further possible details and embodiments which may be considered for the system and its components are described in more detail in the following.

The electrical energy provided by the feed-in device may be a direct current (DC). To provide the electrical energy, the feed-in device may be electrically connected to a current source or DC source, respectively, and in this way be electrically supplied by the current source. Alternatively, the electrical energy provided with the aid of the feed-in device may be an alternating current (AC). In this context, the feed-in device may be electrically connected to an alternating current source.

Within the field devices, the electrical energy may inter alia be transported via internal electrical conductors. The electrical conductors may e.g. be configured as conductor paths.

As indicated above, at least one or a plurality of or all field devices of the system may have a terminal device and thereby be connected to field components (sensors and/or actuators) in order to supply them electrically. In this context, the relevant field devices may serve as energy distributors for the field components. The terminal device of a field device may have at least one output line terminal for connecting an output line. In an embodiment with a plurality of output line terminals, a plurality of output lines may be connected to the terminal device.

The field components (sensors and/or actuators) may be attributed to the system and thus be components of the system. The same applies to lines used, such as supply lines and output lines. The lines used may be provided with plug connectors, with the aid of which the lines may be connected to components such as the field devices and field components.

As indicated above, a plurality of or all field devices of the system may have at least one output terminal in addition to the input terminal. In this way, the following embodiment is conceivable for the system.

In a further embodiment, the feed-in device is connected to one of the field devices via a supply line, and the field devices are connected to one another via further supply lines, each connecting two field devices. This setup may be characterized by a low wiring effort. The supply lines connecting the field devices may be connected to input terminals and output terminals of field devices. The supply line connecting the feed-in device to one of the field devices may be connected to a feed-in device output terminal of the feed-in device and an input terminal of the field device concerned.

In the aforementioned embodiment, the electrical energy provided by the supply device may be supplied to a field device and, starting from this, forwarded to the other field devices, i.e. in each case from one to another field device. Those field devices which have a terminal device may further distribute the electrical energy made available to them in this way to field components (sensors and/or actuators) via output lines connected to them.

The system comprises at least one, i.e. one or a plurality of, monitoring field devices, as indicated above. The following description, which refers inter alia to embodiments of the or a monitoring field device, may be applied with respect to all monitoring field devices of the system.

The monitoring device of the monitoring field device may be electrically connected to the input terminal and to the at least one output terminal. Furthermore, the monitoring device may be arranged between the input terminal and the at least one output terminal of the monitoring field device.

In a further embodiment, the monitoring device of the monitoring field device has a detector device for detecting a current change when a spark is generated, a control unit, and a switching unit. The control unit is configured to carry out an energy shutdown by actuating the switching unit based on a change in current detected by the detector device. This allows the energy supply to be switched off reliably by at least one field device downstream of the monitoring field device in the event of a fault.

In a further embodiment, the detector device of the monitoring device of the monitoring field device comprises a first detector and a second detector. The first detector is configured to detect a change in current when a make spark occurs. Such a spark may occur when a circuit is closed or short-circuited. The second detector is configured to detect a change in current when a break spark occurs. Such a spark may occur when a circuit is opened or disconnected. In operation, the detectors may be used to reliably detect a change in current that reflects the occurrence of a spark, and the control unit may use this as a basis for reliably switching off the electrical energy supply by appropriately controlling the switching unit.

The aforementioned embodiment may be applied in a corresponding manner with respect to the feed-in device of the system. For this purpose, according to a further embodiment, it is provided that the feed-in device monitoring device comprises a feed-in device detector device for detecting a current change in the event of spark generation, a feed-in device control unit and a feed-in device switching unit. The feed-in device control unit is configured to carry out an energy cutoff by actuating the feed-in device switching unit based on a current change detected by the feed-in device detector device. The feed-in device detector device may have a first feed-in device detector for detecting a change in current when a make spark is generated, and a second feed-in device detector for detecting a change in current when a break spark is generated.

In a further embodiment, the monitoring field device of the system comprises a forwarding limiting device configured to cause a limitation of an electrical power transmissible during the forwarding of the electrical energy via the at least one output terminal. This may promote reliable and safe operation of the system. The forwarding limiting device may be arranged upstream of the monitoring device of the monitoring field device.

According to a further embodiment, reliable limiting may be achieved by the forwarding limiting device being configured to effect current limiting and voltage limiting. For this purpose, the forwarding limiting device may have electrical components such as, for example, at least one resistor for current limiting and at least one voltage-limiting component such as a Zener diode or a thyristor for voltage limiting.

In a further embodiment, the monitoring field device of the system comprises a switching device with the aid of which the forwarding of the electrical energy via the at least one output terminal may be switched. With the aid of the switching device, it is possible to separate the input terminal and the at least one output terminal of the monitoring field device from one another, and to control the forwarding of the electrical energy via the at least one output terminal. In this context, the switching device may e.g. be used for short-circuit isolation. The switching device may be arranged between the input terminal and the at least one output terminal, or between the input terminal and the monitoring device.

The monitoring field device of the system comprises at least one, i.e., one or a plurality of, output terminals. In an embodiment with a plurality of output terminals, the monitoring field device may serve as an energy distributor and forward the electrical energy to a plurality of field devices via a plurality of supply lines. Also, a plurality of system sections may be monitored by the monitoring field device in this manner.

With respect to an embodiment of the monitoring field device having a plurality of output terminals, the following embodiments may further be considered. The monitoring field device may comprise a plurality of monitoring devices, i.e., one associated monitoring device for each output terminal. In this way, the energy supply effected by passing the electrical energy through each of the output terminals may be monitored separately with respect to each of the output terminals. The plurality of monitoring devices may each be located between the input terminal and the associated output terminal.

The monitoring field device may further comprise a plurality of forwarding limiting devices, i.e. one associated forwarding limiting device for each output terminal and monitoring device. In this way, a limitation of the transmissible electrical power may be achieved separately with respect to each of the output terminals. The forwarding limiting devices may be arranged upstream of the associated monitoring devices.

The monitoring field device may also comprise a plurality of switching devices, i.e. an associated switching device for each output terminal and monitoring device. This allows the forwarding of electrical energy to be controlled via the individual output terminals. The switching devices may each be arranged between the input terminal and the associated output terminal or between the input terminal and the associated monitoring device.

Apart from the monitoring field device, further or a plurality of or even all field devices of the system may comprise at least one output terminal in addition to the input terminal. In this context, the relevant field devices may each comprise a corresponding switching device between the input terminal and the at least one output terminal, as a result of which the forwarding of the electrical energy via the at least one output terminal may be controlled. In an embodiment with a plurality of output terminals, the field devices may serve as energy distributors and forward the electrical energy to a plurality of field devices via a plurality of supply lines.

The at least one switching device of a field device may e.g. be controlled with the aid of a communication controller described further below.

In a further embodiment, the field devices of the system comprise a decoupling device configured to provide a predetermined input impedance for detecting spark generation. In this way, the field devices may have a known and predictable electrical behavior, which makes it possible to reliably and accurately detect spark generation by the feed-in device and by the at least one monitoring field device in the event of a fault. With the help of the decoupling device of a field device, it may be suppressed that components or circuit components of the field device downstream of the decoupling device may influence the detection of the spark generation.

The decoupling device of a field device may be connected to, and may be downstream of, the associated input terminal. The decoupling device may comprise electrical components such as an LC low-pass filter having an inductor and at least a capacitor. Furthermore, at least one component such as a diode may be provided for providing a current flow direction. A further possible component of the decoupling device is a voltage limiting device, for example in the form of a clamping circuit constructed from voltage-limiting components such as diodes, which may be connected in parallel to the inductor.

In the case of the at least one monitoring field device of the system, the associated decoupling device may serve as the end termination or termination impedance of a monitored system section of the system. The relevant system section may be monitored by the feed-in device arranged upstream of the monitoring field device or, in the case of an embodiment of the system having a plurality of monitoring field devices, also by a further monitoring field device arranged upstream of the monitoring field device in question.

With the aid of a decoupling device terminating a system section, it may be achieved in each case that components or circuit components downstream of the decoupling device have no influence on the detection of spark generation in the monitored system section. In this context, the at least one monitoring field device may be configured in such a way that the monitoring device of the monitoring field device is arranged downstream of the decoupling device. In a corresponding manner, in an embodiment with a plurality of monitoring devices, the plurality of monitoring devices may be arranged downstream of the decoupling device. The same applies to one or to a plurality of forwarding limiting devices. In this way, the monitoring device(s) and the forwarding limiting device(s) may be prevented from interfering with the detection of spark generation.

With regard to terms used such as "upstream", "downstream" and "subsequent", it is pointed out that these terms may refer to the transporting or forwarding of electrical energy.

In a further embodiment, the field devices of the system have an inrush current limiter, which is configured to limit an inrush current at the start of the electrical energy supply. In this way, it may be avoided that a high or excessive inrush current occurs at one or a plurality of field devices at the start of the electrical energy supply, with the consequence that the electrical energy supply is switched off incorrectly by the feed-in device or by the at least one monitoring field device, although no sparks are generated.

In a further embodiment, the field devices of the system have an internal power supply device that may be electrically supplied via the supplied electrical energy. With the aid of the internal power supply device of a field device, at least one internal device or component of the field device may be supplied with electrical energy.

The system may be used not only to supply energy to field components (sensors and/or actuators), which may be connected to one or to a plurality of field devices, but also to carry out data communication and control with reference to these components. In this sense, the system may be configured as an automation system. In this context, the embodiments described below may be applied.

In a further embodiment, the field devices of the system are configured to carry out data communication by the field devices having at least one communication terminal for connecting a data line for receiving and/or transmitting data signals and a communication controller connected to the at least one communication terminal. In this embodiment, the communication controller, via which the data communication of the associated field device may be controlled, may receive and/or transmit data signals via the communication terminal.

Within the field devices, data communication may inter alia take place via internal data connections or data lines with corresponding electrical conductors. The electrical conductors may e.g. be configured as conductor paths.

Data communication may also take place outside of the field devices or between the field devices themselves via electrical conductors or data lines with electrical conductors. Instead of carrying out data communication between the field devices in electrical form, optical data communication using optical fibers or fiber-optic-based data lines may also be considered.

In a further embodiment, in the at least one field device provided with the terminal device, the communication controller is connected to the terminal device via a communication connection in order to receive and/or transmit data signals via the terminal device. In this context, data communication with at least one field component (sensor or actuator) connected to the terminal device via an output line may be carried out via the relevant field device or its communication controller. As was described above, a plurality of or even all field devices of the system may have a terminal device, so that data communication with field components (sensors and/or actuators) connected to the terminal devices via output lines may be carried out via the respective field devices or their communication controller. For example, sensor data or sensor signals may be read out from sensors and forwarded via the field devices. Furthermore, control data or control signals may be transmitted to actuators.

In this context, the system may further comprise a superordinate controller, which may be suitably connected to the field devices in order to carry out data communication with the field devices and/or with their communication controllers. In this way, the field devices or their communication controllers may transmit data signals such as sensor signals to the superordinate controller and/or receive data signals such as control signals from the superordinate controller. Data communication may take place between the field devices themselves and between the field devices and the superordinate controller, whereby the latter may take place via the feed-in device if necessary.

It is possible that at least one field device of the system does not have a terminal device, and thus cannot be connected to a field component. Such an embodiment is conceivable, for example, with respect to the at least one monitoring field device. In this context, the field device in question may be used, in addition to forwarding electrical energy and, as the case may be, monitoring, to carry out data communication with at least one further field device and, as the case may be, with the feed-in device.

At least one field device or a plurality of or all field devices of the system may further have a plurality of or two communication terminals connected to the associated communication controller. In this way, data communication may further take place via two field devices connected by a data line or via a plurality of field devices connected by data lines.

With reference to the terminal device, which is present in at least one field device, the following embodiment may also be applied. In a further embodiment, the terminal device comprises an input/output controller which is configured to control receiving and/or transmitting of data signals via the terminal device. In this way, reliable data communication with at least one field component (sensor or actuator) connected to the terminal device via an output line is possible. The input/output controller may communicate with the associated communication controller of the field device via the communication connection to transmit or receive corresponding data signals to and from the communication controller.

If the field devices are configured to carry out data communication as described above, the following embodiments may be used to keep the wiring effort as low as possible.

In a further embodiment, the input terminal of the field devices is configured as a hybrid terminal comprising the at least one communication terminal, to which a supply line in the form of a hybrid line may be connected. In this embodiment, the input terminal may be used to feed in electrical energy for energy supply and to transmit data signals. The supply line connected to the input terminal may simultaneously function as a data line via which electrical energy for energy supply and data signals may be transmitted.

An embodiment in the form of a hybrid terminal may also be considered with respect to the at least one output terminal present on the at least one monitoring field device. Further or a plurality of or all field devices of the system may also have at least one output terminal as indicated above. For this purpose, according to a further embodiment, it is provided that the at least one output terminal is configured as a further hybrid terminal comprising a communication terminal, to which a further supply line configured as a hybrid line may be connected. In this embodiment, the output terminal may be used to pass on electrical energy for energy supply and to transmit data signals. The supply line connected to the output terminal may simultaneously function as a data line via which electrical energy for energy supply and data signals may be transmitted.

With regard to the at least one output line terminal of a terminal device, which is provided on at least one field device, an embodiment as a hybrid terminal is also conceivable in order to be able to transmit electrical energy and data signals. An output line connected to this, which may be connected to a field component (sensor or actuator), may be configured as a hybrid line for transmitting electrical energy and data signals.

With regard to the scenario of use described above, in which the field devices are located in a potentially explosive atmosphere (e.g. zone 1/21 according to the ATEX Directive) and the field components (sensors and/or actuators) are located in a more potentially explosive atmosphere (e.g.

zone 0/20 according to the ATEX Directive), the following embodiments may further be considered to achieve a high level of system safety.

In a further embodiment, the at least one field device provided with the terminal device comprises a first device section and a second device section. The first device section comprises the input terminal, and the second device section comprises the terminal device. The electrical energy provided by the feed-in device may be supplied to the first device section via the input terminal, transmitted from the first device section to the second device section via an electrical energy supply connection, and forwarded to at least one field component (sensor or actuator) via the terminal device. The electrical energy supply connection of the first and second device sections comprises a power limiting device which is configured to cause a limitation of an electrical power which may be transmitted from the first device section to the second device section as part of the energy transmission.

As indicated above, the terminal device may comprise at least one output line terminal for connecting at least one output line, so that a connection may be established with at least one field component (sensor or actuator). In the aforementioned embodiment, the power limiting device may be used to limit the electrical power that may be transmitted from the first device section to the second device section or the maximum electrical power that may be transmitted. This may ensure that the electrical energy available at the terminal device or at the at least one output line terminal of the second device section is limited and is not sufficient to generate a spark or ignition spark in the area of the terminal device or the at least one output line terminal, and thus also in the area of an output line connected thereto and a field component connected thereto, in the event of a fault.

The power limiting device may be configured to effect current limitation and voltage limitation. For this purpose, the power limiting device may have electrical components such as, for example, at least one resistor for current limitation and at least one voltage-limiting component such as a Zener diode or a thyristor for voltage limitation.

If a plurality of or all field devices of the system have a terminal device, the aforementioned embodiment with the first and second device section and the power limiting device may be present in all field devices equipped with the terminal device. The same applies to features described in the following.

Depending on the embodiment, the first device section may comprise, in addition to the input terminal, at least one further of the above-mentioned components, e.g. at least one output terminal, at least one switching device, a decoupling device, an inrush current limiter, an internal power supply device, a communication controller and/or at least one communication terminal. Also, for the at least one monitoring field device, if this has a terminal device, an embodiment with the first and second device section and the power limiting device may be considered. In this context, the first device section may additionally comprise the or at least one monitoring device and, as the case may be, at least one forwarding limiting device.

The at least one or a plurality of field devices embodied with the first and second device sections may further comprise galvanic isolation. A galvanic isolation may be embodied in the first device section or in the electrical energy supply connection of the first and second device section and/or in the power limiting device. This allows the electrical energy supplied to the first device section to be conducted on separate electrical circuits, which promotes reliable and safe operation of the system. In addition or as an alternative, a galvanic isolation may be embodied in the feed-in device.

With respect to the data communication described above, in an embodiment of one or a plurality of field devices comprising the first and second device sections, the following may further be considered. As indicated above, the communication controller may be connected to the terminal device via a communication connection. The communication controller may be part of the first device section, and the terminal device having the at least one output line terminal may be part of the second device section.

In a further embodiment, the communication connection of the communication controller and the terminal device comprises a barrier device which is configured to cause a limitation of an electrical power which may be transmitted from the communication controller to the terminal device during a data communication and/or a galvanic isolation. This ensures that no spark or ignition spark may be caused in the area of the terminal device or the at least one output line terminal, and thus also in the area of an output line connected thereto and a field component (sensor or actuator) connected thereto, as a result of the data communication.

In a further embodiment, a physical interface is arranged between the communication controller and the at least one communication terminal of the field devices. With the aid of the physical interface, which may also be referred to as PHY and which may be implemented as a physical interface component, processing may take place by encoding or decoding data signals.

In a further embodiment, a barrier circuit is additionally or alternatively arranged between the communication controller and the at least one communication connection of the field devices, which is configured to cause a limitation of an electrical power that may be transmitted to the communication connection during a data communication and/or a galvanic isolation. With the aid of the barrier circuit, it may be achieved that no spark or ignition spark may be caused in the area of the communication connection, and thus also in the area of a data or supply line connected to it, as a result of the data communication.

With reference to optical fiber-based data communication as indicated above, the following may be considered. In a further embodiment, an optical transceiver is additionally or alternatively arranged between the communication controller and the at least one communication terminal of the field devices, which is configured to convert optical data signals into electrical data signals and/or electrical data signals into optical data signals. The conversion into electrical data signals refers to the receiving of data signals, and the conversion into optical data signals refers to the transmitting of data signals via the communication terminal.

In an embodiment of a field device having a plurality of or two communication terminals, a physical interface and/or barrier circuit may be arranged between each of the communication terminals and the communication controller. With reference to optical data communication, a physical interface and/or an optical transceiver may be arranged between each of the communication terminals and the communication controller.

The field devices may further be configured as follows. In a further embodiment, the input terminal and, if present, at least one output terminal, is configured according to a first type of ignition protection. In at least one field device comprising the first device section and the second device section with the terminal device, the at least one output line terminal of the terminal device is configured according to a second type of ignition protection. The second type of ignition protection corresponds to a larger level of protection than the first type of ignition protection.

The second type of protection may be the type of protection intrinsically safe Ex ia, and the first type of protection may be the type of protection intrinsically safe Ex ib. For this purpose, components present in the area of the respective terminals, such as internal components and electrical conductors, may have embodiments corresponding to the ignition protection types, for example with regard to distances and redundancies. The monitoring function of the feed-in device and the at least one monitoring field device as well as the power limitation due to the power limiting device, may also contribute to the aforementioned intrinsic safety Ex ia and Ex ib of the terminals.

The field devices may also be embodied with a cast encapsulation. In this context, the field devices or their housings may be filled with a casting compound, which may prevent the penetration of an explosive mixture into the field devices. In this way, the field devices may be embodied in accordance with the Ex mb type of protection. Furthermore, a further or equivalent type of protection for the field devices is possible, e.g. an embodiment with a pressure-proof encapsulation. This means that the field devices may be embodied in accordance with the Ex db type of protection.

With reference to the feed-in device of the system, the following embodiments are further conceivable.

The feed-in device may comprise a current supply input through which the feed-in device may be electrically connected to a current source or DC source to be electrically supplied by the current source. The feed-in device may further comprise a feed-in device limiting device which is configured to cause a limitation of the electrical power supplied to the feed-in device via the current supply input. In this way, the electrical power provided by the feed-in device for energy supply to the field devices may be limited at the same time. The feed-in device limiting device may be configured to cause a current limitation and a voltage limitation.

As indicated above, the feed-in device may comprise galvanic isolation. The galvanic isolation may be embodied in the feed-in device limiting device.

The feed-in device may further comprise a feed-in device output terminal for connecting a supply line. The feed-in device may be connected to one of the field devices via this supply line.

With regard to data communication, the system may have a superordinate controller as described above. In this context, it may be considered that the superordinate controller is connected to the field devices via the feed-in device in order to communicate or exchange data signals with them.

For this purpose, the feed-in device may be configured to carry out data communication. For this purpose, the feed-in device may have a communication input via which the feed-in device may be connected to the superordinate controller in order to receive data signals from the controller and/or send them to the controller. The feed-in device may further comprise a feed-in device communication controller, two physical feed-in device interfaces for encoding and decoding data signals, respectively, and a feed-in device communication terminal. The feed-in device communication terminal and a data line connected thereto may connect the feed-in device to one of the field devices of the system to transmit and/or receive data signals to and/or from the field device. A first of the physical feed-in device interfaces may be located between the communications input and the feed-in device communications controller, and the second physical feed-in device interface may be located between the feed-in device communication terminal and the feed-in device communications controller.

The feed-in device may further comprise a feed-in device barrier circuit. The feed-in device barrier circuit may be arranged between the feed-in device communication terminal and the second physical feed-in device interface. The feed-in device barrier circuit may be configured to cause limiting of the electrical power that may be transmitted during a data communication and/or to cause galvanic isolation.

For the feed-in device, corresponding to the field devices, an embodiment for carrying out optical fiber-based data communication may be considered. In this context, the feed-in device may comprise an optical feed-in device transceiver, which may be located between the feed-in device communication controller and the feed-in device communication terminal. In this manner, the feed-in device may receive and/or transmit optical data signals from and/or to a field device. The feed-in device may further comprise a further optical feed-in device transceiver, which may be arranged between the feed-in device communication controller and the communication input. In this manner, the feed-in device may receive and/or transmit optical data signals from and/or to the superordinate controller. The feed-in device transceiver(s) may be configured to convert optical data signals into electrical data signals and/or electrical data signals into optical data signals. The conversion into electrical data signals in this context refers to the receiving of data signals, and the conversion into optical data signals refers to the sending of data signals via the feed-in device communication terminal or communication input of the feed-in device.

According to the field devices, the feed-in device output terminal may be configured as a hybrid terminal comprising the feed-in device communication terminal, to which a supply line in the form of a hybrid line may be connected. This allows electrical energy for energy supply and data signals to be transmitted via the supply line.

A monitoring field device is proposed for a system including a feed-in device and a plurality of field devices. The feed-in device is configured to provide an electrical energy for electrical energy supply to the field devices including the monitoring field device, and to detect spark generation in the electrical energy supply to switch off the electrical energy supply based on this. The monitoring field device comprises an input terminal for connecting a supply line, via which the electrical energy provided by the supply device may be supplied to the monitoring field device. The monitoring field device is configured for electrical energy supply to at least one subsequent field device and for monitoring. The monitoring field device comprises at least an output terminal for connecting a further supply line, via which the electrical energy may be forwarded for electrical energy supply to at least one subsequent field device. The monitoring field device also has a monitoring device which is configured to detect spark generation in the electrical energy supply to at least one subsequent field device and, based on this, to switch off the electrical energy supply.

For the proposed monitoring field device, embodiments, features and details described above may be applied in a corresponding manner. When the monitoring field device is used in a system, advantages described above may be achieved in the same way. With the aid of the monitoring field device, together with the feed-in device, it may be suppressed that, in the event of a fault, a spark or ignition spark with sufficient energy for ignition is generated in the area of input and output terminals of field devices as well as in the area of supply lines connected to the field devices. Furthermore, the monitoring may be carried out section by section or segment by segment. In this context, different system sections of the system may be monitored by the supply device and by the monitoring field device. Parameters such as line lengths of supply lines, capacitive and/or inductive effects and associated restrictions may be related to the individual system sections, which makes it possible to embody the system with relatively long line lengths.

The embodiments described above may be used individually or in any combination with one another.

Schematic Figures

On the basis of the following schematic figures, embodiments of a system are described with the help of which field components such as actuators and sensors may be supplied with energy and communication with the field components or control of the field components may be carried out. The field components may in this context be located in a potentially explosive area.

By way of further illustration, FIG. 1 shows a schematic diagram of a system 50. The system 50 comprises a feed-in device 400, a plurality of field devices 100 electrically connected to the feed-in device 400, and a plurality of field components 600 electrically connected to the field devices 100. With respect to the field components 600, the connection is indicated only with respect to one of the field devices 100. The feed-in device 400 is inter alia configured to provide an electrical energy to electrically supply the field devices 100 and also the field components 600. The electrical energy may be a direct current electrical energy supply.

According to the embodiment shown in FIG. 1, the system 50 comprises a row or string of five field devices 100, which are provided with the reference numerals 100-1, 100-2, 100-3, 100-4, 100-5 to distinguish them in FIG. 1, and which are also referred to below as first field device 100-1, second field device 100-2, third field device 100-3, fourth field device 100-4 and fifth field device 100-5. Apart from the above, the system 50 may comprise a different or larger number of field devices 100 (cf. FIG. 6).

The electrical connection between the feed-in device 400 and the field devices 100 or between the field devices 100 among each other is established via supply lines 500. As shown in FIG. 1, the feed-in device 400 is connected to the first field device 100-1 via a supply line 500. The first field device 100-1 is connected to the second field device 100-2, the second field device 100-2 is connected to the third field device 100-3, the third field device 100-3 is connected to the fourth field device 100-4, and the fourth field device 100-4 is connected to the fifth field device 100-5, each via a further supply line 500.

The supply lines 500 are connected to corresponding terminals of the feed-in device 400 and the field devices 100. The feed-in device 400 comprises a feed-in device output terminal 420, via which electrical energy provided by the feed-in device 400 may be output for supplying energy to the field devices 100. The field devices 100 comprise an input terminal 110 and an output terminal 111. The input terminal 110 of the field devices 100 is for supplying electrical energy to the field devices 100, and the output terminal 111 is for passing on the supplied electrical energy, or a section thereof, to another field device 100 to supply electrical energy thereto.

The supply line 500 connecting the feed-in device 400 to the first field device 100-1 is connected to the feed-in device output terminal 420 of the feed-in device 400 and to the input terminal 110 of the first field device 100-1. With reference to the connection of the first through fifth field devices 100-1, 100-2, 100-3, 100-4, 100-5, the supply lines 500 are respectively connected to an output terminal 111 and an input terminal 110 of two successive field devices 100 of the first through fifth field devices 100-1, 100-2, 100-3, 100-4, 100-5. The supply lines 500 may comprise electrical conductors or cores for transporting electrical energy and plug connectors having corresponding contacts at the ends thereof, with the aid of which the supply lines 500 may be plugged to connect to the respective terminals.

The field devices 100 are further configured to establish an electrical connection with the external field components 600 of the system 50, as illustrated in FIG. 1 with reference to the first field device 100-1 only. In this manner, the field components 600 may be electrically supplied by the electrical energy provided by the feed-in device 400 and transmitted to the field devices 100. The field components 600 may be sensors and/or actuators of the system 50.

The field devices 100 of the system 50 shown in FIG. 1 comprise a plurality of output line terminals 165 for connecting output lines 510. Apart from the embodiment shown in FIG. 1 with four output line terminals 165 per field device 100, the field devices 100 may be embodied with a different or larger number of output line terminals 165. A field component 600 may be connected to a field device 100 via an output line 510. Corresponding to the supply lines 500, the output lines 510 may have cores and connectors with corresponding contacts at their ends, with the aid of which the output lines 510 may be plugged for connection to the output line terminals 165 of the field devices 100 and corresponding terminals of the field components 600.

The electrical energy provided by the feed-in device 400 may be introduced into the first feed-in device 100-1 via the supply line 500 connecting the feed-in device 400 to the first field device 100-1. Starting from this, the electrical energy may be respectively forwarded from one field device 100 to the next, i.e. from the first field device 100-1 to the second field device 100-2, from the second field device 100-2 to the third field device 100-3, etc., via the supply lines 500 connecting the respective field devices 100 in pairs for energy supply. The electrical energy introduced into the individual field devices 100 may further be forwarded or redistributed to the field components 600 via the output lines 510 connected to the field devices 100 to electrically supply the field components 600. In this regard, the field devices 100 may serve as energy distributors for the field components 600.

In addition to the feed-in device 400, the field devices 100, and the field components 600, the system 50 comprises a superordinate controller 700 used to control the system 50. The controller 700 is used, among other things, to control actuators using control data or control signals, which inter alia is carried out based on sensor data or sensor signals from sensors. Accordingly, the system 50 is configured to carry out data communication to allow for data exchange between, inter alia, the controller 700 and the field components 600. In this regard, data communication may be carried out between the field devices 100 and the field components 600 connected thereto, between the field devices 100 among one another, between the first field device 100-1 and the feed-in device 400, and between the controller 700 and the feed-in device 400. In this context, the feed-in device 400 may serve as a communication intermediary between the controller 700 and the field devices 100, and the field devices 100 may in turn serve as a communication intermediary between the feed-in device 400 and the field components 600.

To keep the wiring effort low, the data communication between the feed-in device 400 and the field devices 100 or between the feed-in device 400 and the first field device 100-1 as well as between the field devices 100 among one another, as well as the data communication between the field devices 100 and the field components 600, takes place via the same interfaces and lines as they are used for the electrical energy supply. In this respect, the feed-in device output terminal 420 of the feed-in device 400 and the input terminals 110, output terminals 111, and output line terminals 165 of the field devices 100 serve as hybrid terminals through which both electrical energy for energy supply and data signals may be transmitted. In a corresponding manner, the supply lines 500 and output lines 510 serve as hybrid lines for transmitting electrical energy and data signals. Further details on this will be described in more detail below.

Figure 2:
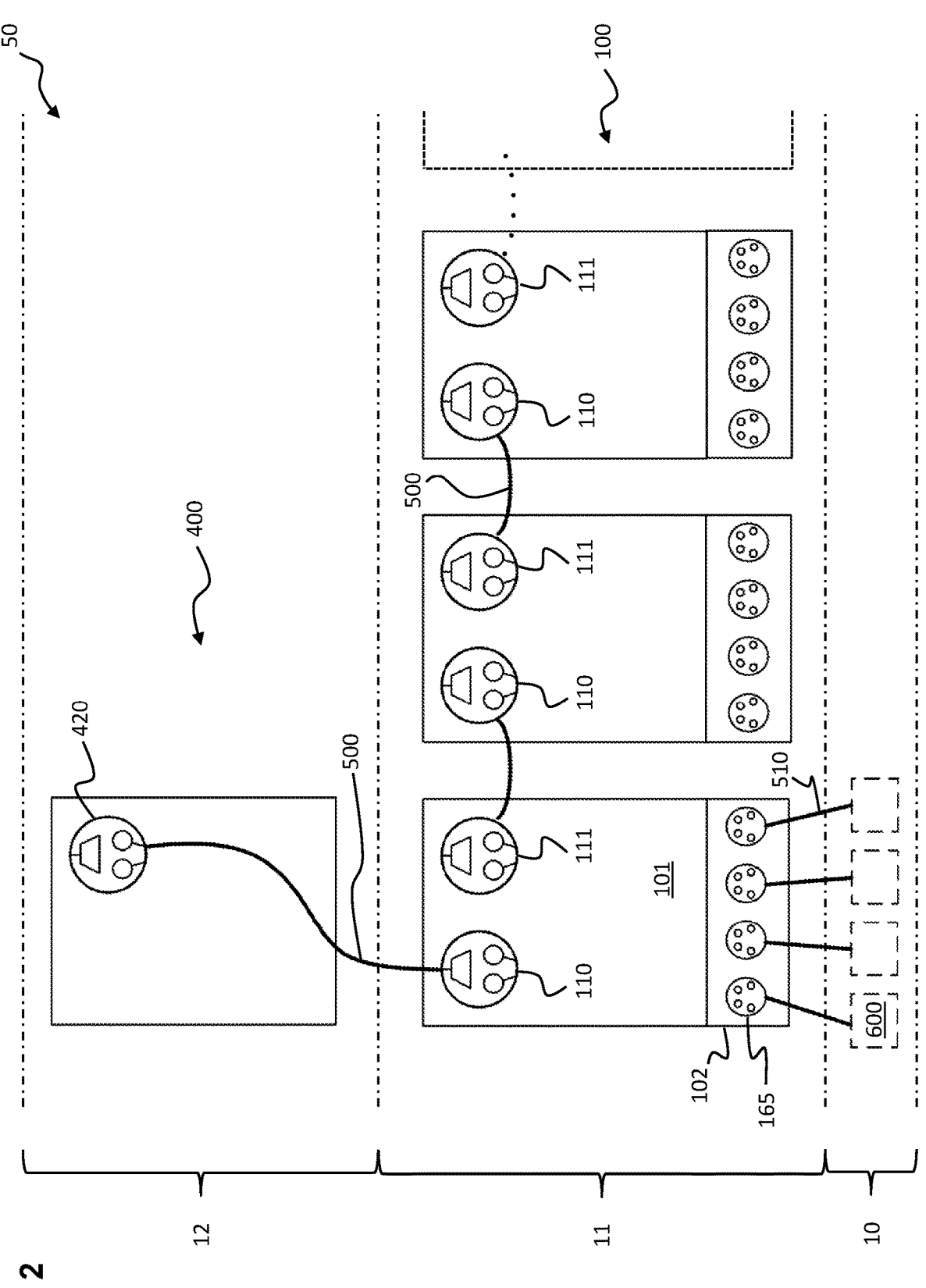
FIG. 2 shows a scenario of using the system in which the feed-in device, the field devices and the field components are located in different areas.

FIG. 2 illustrates a possible scenario of use that may be considered for the system 50. In this context, the field components 600 connected to the field devices 100 are located in a first area 10. The first area 10 is a hazardous area. In the first area 10, a hazardous explosive atmosphere as a mixture of air and flammable gases, vapors, mists, or dusts may be present continuously, for long periods of time, or frequently. The first area 10 may e.g. be a zone 0/20 according to the ATEX directive. The field devices 100 are arranged in a second area 11. The second area 11 is a less explosive area, unlike the first area 10. A hazardous explosive atmosphere may occasionally form in the second area 11 as a mixture of air and flammable gases, vapors, mists or dusts. The second area 11 may e.g. be a zone 1/21 according to the ATEX directive. The feed-in device 400 is located in a third area 12. Unlike the other areas 10, 11, the third area 12 is a non-hazardous or low-hazardous area. In the third area 12, a hazardous explosive atmosphere as a mixture of air and combustible gases, vapors, mists or dusts may not occur, or may occur only rarely and for a short time. The third area 12 may e.g. be a zone 2/22 according to the ATEX directive.

The scenario of use shown in FIG. 2 may be made possible by, on the one hand, monitoring the electrical energy supply of the field devices 100 in order to extinguish a spark that arises in the event of a fault by quickly switching off the energy supply, and, on the other hand, providing a power-limiting embodiment for the field devices 100. In the system 50, monitoring is carried out by the feed-in device 400 and by one or a plurality of field devices 100, which are for this purpose configured as monitoring field devices 800. As shown in FIG. 1, the third and fifth field devices 100-3, 100-5 may be such monitoring field devices 800. Depending on the embodiment of the system 50, the monitoring by the feed-in device 400 and by the monitoring field devices 800 refers to at least one subsequent field device 100. The feed-in device 400 and the field devices 100 may be embodied as described below.

Figure 3:
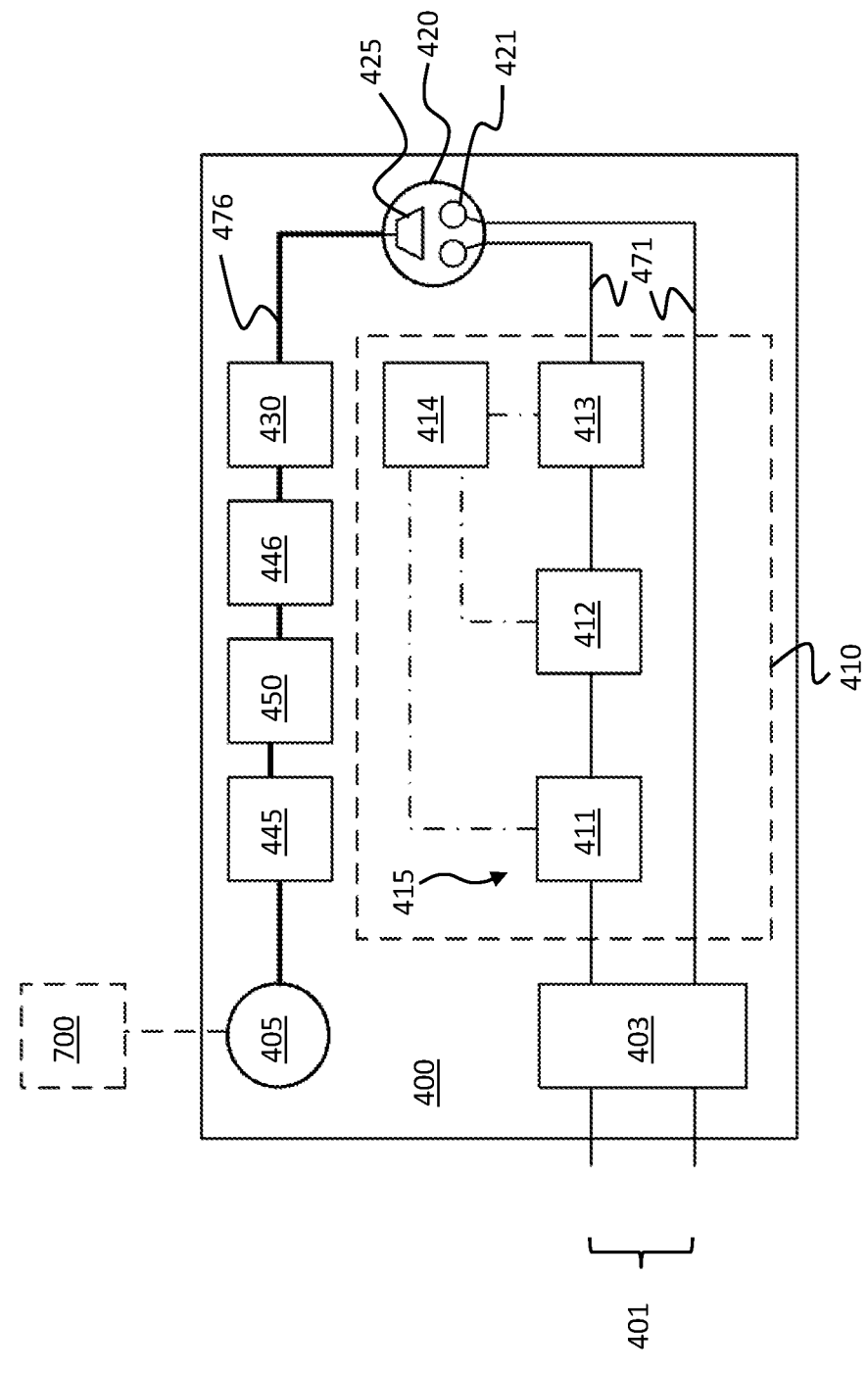
FIG. 3 is a depiction of the feed-in device.

FIG. 3 shows an illustration of the feed-in device 400 of the system 50 according to a possible embodiment. With respect to the provision of electrical energy, the feed-in device 400 comprises a current supply input 401, via which the feed-in device 400 may be electrically connected to a current source or DC source, which is not shown, and in this way may be electrically supplied by the current source. A further component is a feed-in device limiting device 403 connected to the current supply input 401. The feed-in device limiting device 403 is configured to cause a limitation of the electrical power supplied to the feed-in device 400 via the current supply input 401 before it is forwarded to the field devices 100 (or, according to the depiction of FIG. 1, to the first field device 100-1 and via this to the further field devices 100) within the framework of the electrical energy supply via the feed-in device output terminal 420. The feed-in device limiting device 403 may be used to effect current limiting and voltage limiting. Furthermore, the feed-in device 400 may have a galvanic isolation, which may be embodied in the feed-in device limiting device 403.

The feed-in device 400 further comprises a feed-in device monitoring device 410 disposed between the feed-in device limiting device 403 and the feed-in device output terminal 420, the feed-in device monitoring device 410 being configured to detect spark generation in the electrical energy supply due to a fault and to shut down the electrical energy supply based on this. The detection and shutdown are carried out with a low latency to prevent a spark from being generated with relevant energy sufficient for ignition.

As shown in FIG. 3, the feed-in device monitoring device 410 comprises a feed-in device detector device 415 comprising a first feed-in device detector 411 and a second feed-in device detector 412, a feed-in device switching unit 413, and a feed-in device control unit 414 connected to both feed-in device detectors 411, 412 and the feed-in device switching unit 413. The first feed-in device detector 411 may be configured to detect a change in current when a make-spark is generated. Such a spark may be caused by a closing or short-circuiting of an electrical circuit. The current change that occurs may be an increase in electrical current over time (i.e. +di/dt). The second feed-in device detector 412 may be configured to detect a change in current when a break spark occurs. Such a spark may be generated by an opening or breaking of an electrical circuit. The change in current that occurs may be a reduction in electrical current over time (i.e., −di/dt).

During operation of the feed-in device monitoring device 410, the first and second feed-in device detectors 411, 412 may be used to detect a current change characteristic of a spark generation and thus the spark generation. Based on this, the feed-in device control unit 414 may switch off the electrical energy supply to the field devices 100 by appropriately controlling the feed-in device switching unit 413. This has the effect of extinguishing the spark.

As will be discussed in more detail below with reference to FIG. 5, the monitoring field devices 800 of the system 50 comprise a monitoring device 810 corresponding to the feed-in device monitoring device 410. With the aid of the monitoring device 810 of a monitoring field device 800, a spark occurring during the electrical energy supply of at least one subsequent field device 100 by forwarding the electrical energy due to a fault may be detected in a corresponding manner, and based on this the electrical energy supply may be switched off. This also results in the spark being extinguished.

The presence of a spark, which may be detected by the feed-in device 400 and by the monitoring field devices 800, may relate to the area of the input and output terminals 110, 111 of the field devices 100 and the supply lines 500 connected thereto. In this regard, as will be discussed in more detail below with reference to FIG. 6, distributed or sectional monitoring of the system 50 may be accomplished by monitoring different sections of the system using the feed-in device monitoring device 410 of the feed-in device 400 and the monitoring devices 810 of the monitoring field devices 800. The extinction of a spark due to the disconnection of the energy supply is associated with a spark duration limitation, which may reliably prevent a spark with sufficient energy for ignition from being generated in the region of the input and output terminals 110, 111 of the field devices 100 and the supply lines 500.

With respect to the feed-in device 400, further indicated in FIG. 3 are internal electrical conductors 471 thereof through which electrical energy may be transported within the feed-in device 400 and through which components of the feed-in device 400, including the feed-in device output terminal 420, are interconnected. With reference to the feed-in device output terminal 420, two internal conductors 471 are routed to and connected to two terminal contacts 421 of the feed-in device output terminal 420. The terminal contacts 421 may be contacted by contacts of a connector of a supply line 500 (cf. FIG. 1) provided for connection to the feed-in device output terminal 420, as a result of which the electrical energy provided by the feed-in device 400 may be conducted via the respective supply line 500.

Figure 4:
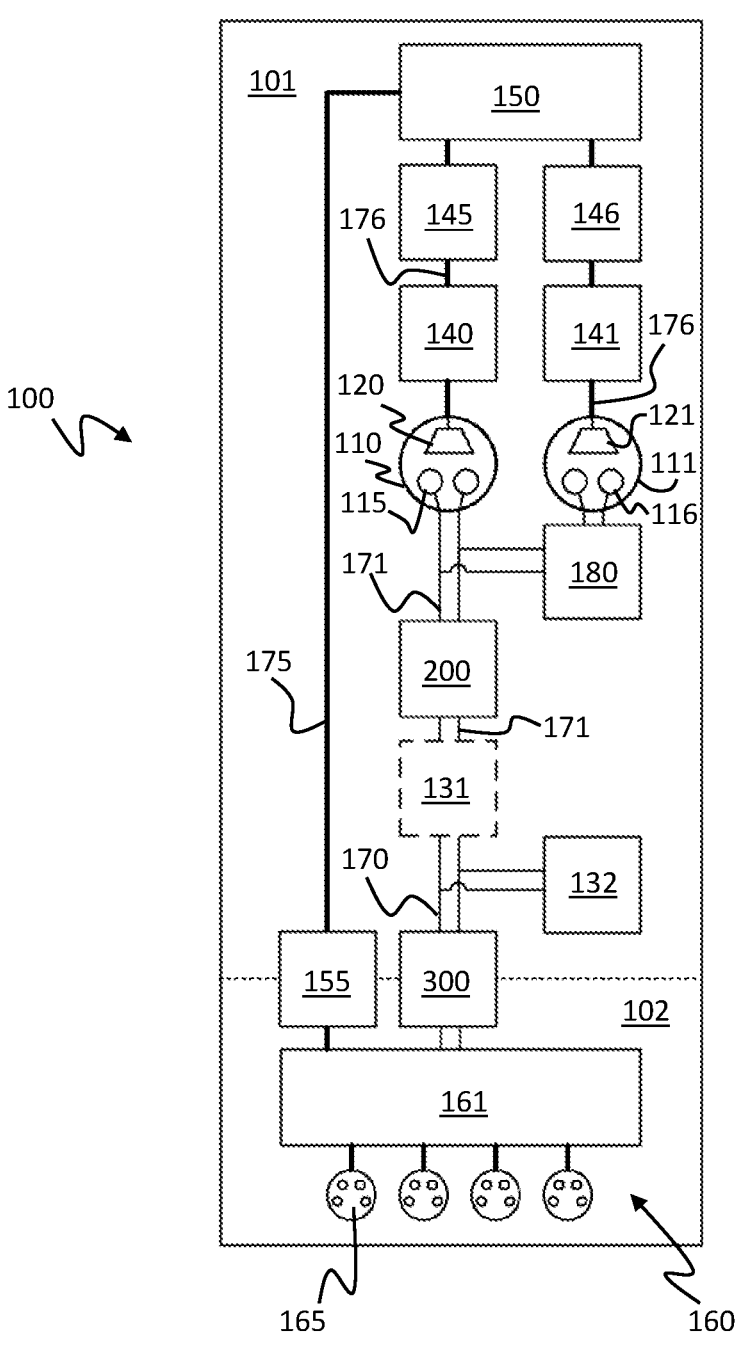
FIG. 4 is an illustration of a field device.

FIG. 4 shows an illustration of a field device 100 of the system 50 according to a possible embodiment, which is not embodied as a monitoring field device 800 and therefore cannot be used for monitoring. The design shown here may be applied to all field devices 100 of the system 50 that are not configured for monitoring, i.e. with reference to FIG. 1 to the first, second and fourth field devices 100-1, 100-2, 100-4. The field device 100 shown in FIG. 4 comprises a first device section 101 and a second device section 102. The first device section 101 comprises the terminals described above and used for connecting supply lines 500, i.e., the input terminal 110 and the output terminal 111. Via the input terminal 110, the electrical energy provided with the aid of the feed-in device 400 may be introduced into the first device section 101 of the field device 100. The output terminal 111 may output the electrical energy and thereby transmit it to another field device 100 for energy supply. FIG. 4 further indicates internal electrical conductors 171 of the field device 100 through which the electrical energy may be transported or transmitted within the field device 100, and through which components of the field device 100 such as the input terminal 110 and the output terminal 111 are interconnected. The internal conductors 171 may conductive paths.

The input terminal 110 comprises two terminal contacts 115, which are connected to two internal electrical conductors 171. The output terminal 111 also has two terminal contacts 116, which are connected to two internal electrical conductors 171. The terminal contacts 115, 116 of the input terminal 110 and of the output terminal 111, which are used in the context of the electrical energy supply, may each be contacted by contacts of plug connectors of supply lines 500 (cf. FIG. 1) used for connection to the input terminal 110 and the output terminal 111, as a result of which the electrical energy may be fed in or forwarded via the respective supply line 500.

As shown in FIG. 4, the second device section 102 comprises a terminal device 160 that comprises output line terminals 165 used to connect output lines 510. The field device 100 may be connected to field components 600 via the output line terminals 165 and output lines 510 connected thereto (see FIG. 1, FIG. 2). The terminal device 160 further comprises an input/output controller 161 connected to the output line terminals 165, which may be used in data communication as described further below.

The first device section 101 and the second device section 102 are connected via an electrical energy supply connection 170, through which the electrical energy supplied to the first device section 101 via the input terminal 110 may be transmitted to the second device section 102, and thus to the terminal device 160 comprising the output line terminals 165. In this context, as indicated in FIG. 4, the electrical energy introduced into the second device section 102 may be conducted to the output line terminals 165 via the input/output controller 161 or through the input/output controller 161, or it may be conducted past the input/output controller 161 or in parallel to the input/output controller 161. From here, electrical energy may be forwarded to field components 600 to electrically supply them.

As shown in FIG. 4, the electrical energy supply connection 170 of the field device 100 comprises, in addition to internal electrical conductors 171, a power limiting device 300. The power limiting device 300, which is located between the input terminal 110 and the terminal device 160 or the input/output controller 161, is configured to cause a limitation of the maximum electrical power that may be transferred from the first device section 101 to the second device section 102 as part of the energy transmission. With the aid of the power limiting device 300, a current limitation and a voltage limitation may be caused. The power limitation is configured such that the electrical energy available, taking into account all downstream energy storages, is insufficient to produce an ignition spark in the region of the connection device 160 or the output line terminals 165, the output lines 510 connected thereto, and the field components 600 connected thereto in the event of a fault.

The first device section 101 of the field device 100 illustrated in FIG. 4 further comprises a decoupling device 200 disposed between the input terminal 110 and the power limiting device 300. The decoupling device 200 is configured to provide a predetermined input impedance of the field device 100 with respect to detecting spark generation. This allows the field device 100 to have a known and predictable electrical behavior, which allows spark generation to be detected with a high degree of reliability and accuracy by the feed-in device 400 or by a monitoring field device 800 in the event of a fault.

As shown in FIG. 4, the first device section 101 of the field device 100 further comprises a switching device 180. Via the switching device 180 and internal electrical conductors 171, the input terminal 110 used for introducing electrical energy into the first device section 101 and the output terminal 111 used for outputting or forwarding the electrical energy are interconnected. With the aid of the switching device 180, the forwarding of the electrical energy may be switched. In this embodiment, disconnection and connection of the input terminal 110 and the output terminal 111 may be caused by appropriately actuating the switching device 180 arranged between the input terminal 110 and the output terminal 111, as a result of which the forwarding of the electrical energy via the output terminal 111 may be flexibly controlled. In the field device 100 shown in FIG. 4, the connection of the input terminal 110 and output terminal 111 is realized, inter alia, via a current branch leading to the output terminal 111 and to the switching device 180, respectively, and formed by internal electrical conductors 171, which is embodied between the input terminal 110 and the decoupling device 200.

Furthermore, a design having a galvanic isolation may be considered for the field devices 100 of the system 50. For illustration purposes, FIG. 4 shows a possible embodiment of the first device section 101 of the field device 100 with an optional separating device 131, which is arranged between the decoupling device 200 and the power limiting device 300. The separating device 131 is configured to provide galvanic isolation. In this way, the electrical energy supplied to the first device section 101 may be conducted on separate electrical circuits, which may promote reliable and safe operation of the system 50.

The separating device 131 may comprise components such as an inverter, a transformer, a rectifier, and a smoothing capacitor. The inverter may be used to convert electrical energy present as a direct current to an alternating current, which may be supplied to the transformer. The alternating current output by the transformer may be rectified and smoothed with the aid of the rectifier and the smoothing capacitor, so that a direct current may again be present on the output side of the separating device 131.

As indicated above, a galvanic isolation may also be embodied in the feed-in device 400, for example in the feed-in device limiting device 403 (cf. FIG. 3). In this way, the field devices 100 may be implemented without galvanic isolation or without the separating device 131.

The field device 100 shown in FIG. 4 or its first device section 101 further comprises an internal power supply device 132, which may be electrically supplied via the electrical energy supplied to the first device section 101. A current branch leading to the internal power supply device 132 and formed by internal electrical conductors 171 may thereby be embodied between the decoupling device 200 or the separating device 131 and the power limiting device 300, as shown in FIG. 4. The internal power supply device 132 may be used to supply electrical energy to internal devices of the field device 100, for example a communication controller 150 used within the framework of data communication and described further below.

Figure 5:
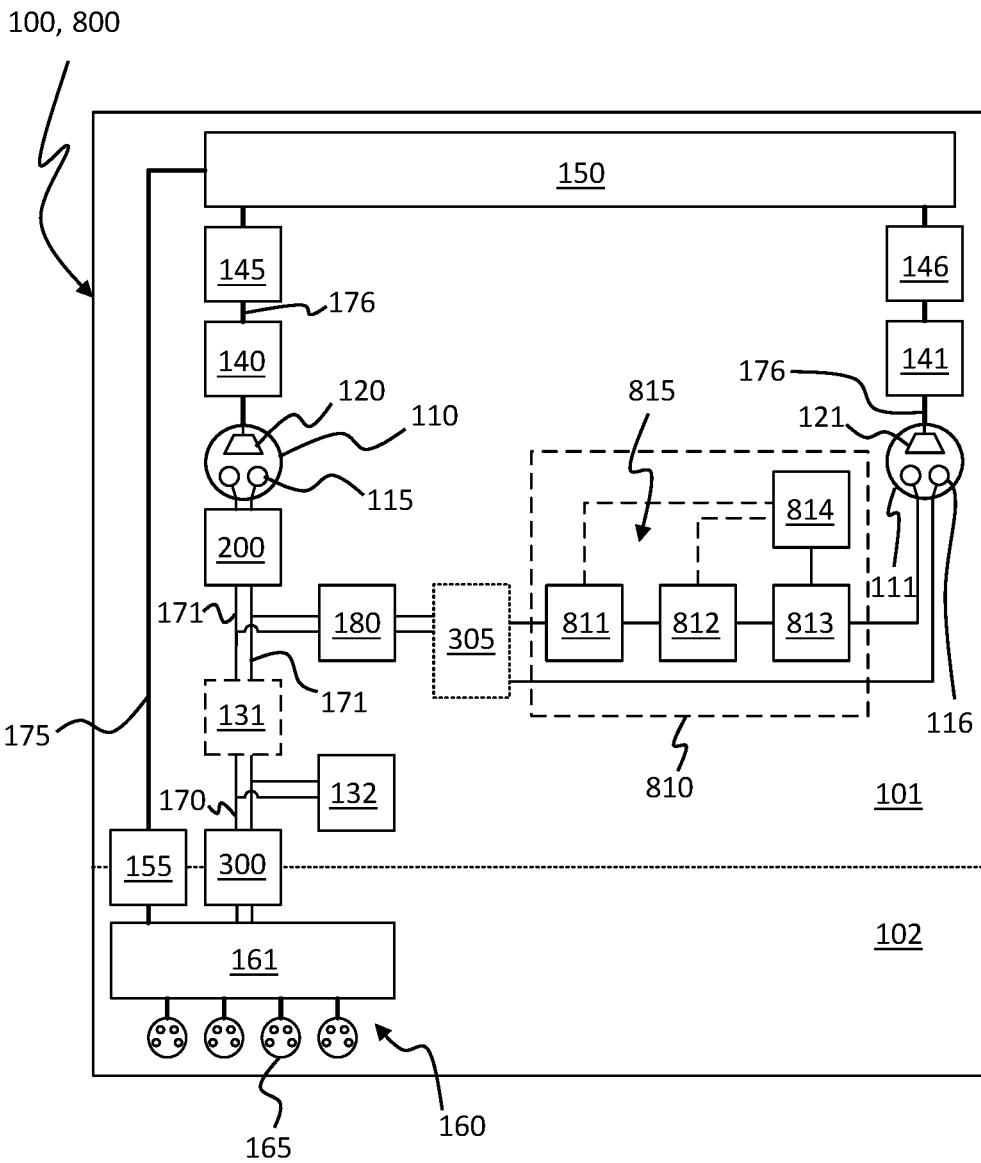
FIG. 5 is a depiction of a further field device which is configured as a monitoring field device, wherein the monitoring field device has an embodiment comprising an input terminal, an output terminal and a terminal device for connecting field components.

FIG. 5 shows a depiction of a field device 100 of the system 50 realized as a monitoring field device 800 according to a possible first embodiment. The embodiment shown here may be used for all monitoring field devices 800 of the system 50, i.e. with reference to FIG. 1 for the third and fifth field device 100-3, 100-5. The monitoring field device 800 shown in FIG. 5 corresponds to a large extent to the field device 100 shown in FIG. 4, which cannot be used for monitoring. Matching features and details, as well as components that are the same and act in the same manner, will therefore not be described in detail again below. Instead, reference is made to the above description for details in this regard.

The monitoring field device 800 shown in FIG. 5 comprises internal electrical conductors 171 for transporting electrical energy, as well as the embodiment described above with the first device section 101 and the second device section 102. The first device section 101 comprises, in addition to the input terminal 110 and the output terminal 111 connected thereto, components such as the decoupling device 200, the switching device 180, the optional separating device 131, and the internal power supply device 132. The second device section 102 comprises the terminal device 160 having output line terminals 165 and the input/output controller 161. The first and second device sections 101, 102 are connected via the electrical energy supply connection 170, through which the electrical energy supplied to the first device section 101 via the input terminal 110 may be transmitted to the second device section 102, and thus to the terminal device 160 having the output line terminals 165. Starting from there, the electrical energy may be transmitted to field components 600. The electrical energy supply connection 170 comprises, in addition to internal electrical conductors 171, the power limiting device 300 used to limit the electrical power that may be transmitted from the first device section 101 to the second device section 102.

As shown in FIG. 5, the monitoring field device 800 comprises switching device 180 between the input terminal 110 and the output terminal 111 and further comprises, downstream of the switching device 180, an optional forwarding limiting device 305 and a monitoring device 810 downstream of the forwarding limiting device 305. With the aid of the switching device 180, the forwarding of electrical energy via the output terminal 111 may be flexibly controlled. The forwarding limiting device 305 is configured to cause a limitation of the maximum electrical power that may be transmitted during the forwarding of the electrical energy via the output terminal 111. This may promote reliable and safe operation of the system 50. With the aid of the forwarding limiting device 305, a current limitation and a voltage limitation may be caused. The forwarding limiting device 305 may also be omitted.

The monitoring device 810 of the monitoring field device 800 connected to the output terminal 111 serves to detect a spark occurring in the electrical energy supply of at least one subsequent field device 100 due to a fault by passing on the electrical energy through the output terminal 111, and based on this, to turn off the electrical energy supply. According to the feed-in device 400, the detection of spark generation and shutdown of the energy supply at the monitoring field device 800 takes place with a low latency to prevent a spark with sufficient energy for ignition from being generated.

The monitoring device 810 comprises a detector device 815 having a first detector 811 and a second detector 812, as well as a switching unit 813 and a control unit 814, which is connected to the two detectors 811, 812 and the switching unit 813. The first detector 811 may, corresponding to the first feed-in device detector 411 of the feed-in device 400, be configured to detect a change in current when a make spark is generated. The second detector 812, corresponding to the second feed-in device detector 412, may be configured to detect a change in current in the case of an occurring break spark.

During operation of the monitoring device 810, the first and second detectors 811, 812 may be used to detect a change in current that is characteristic of a spark generation and thus to detect the spark generation. Based on this, the control unit 814 may switch off the electrical energy supply of at least one field device 100 arranged downstream of the monitoring field device 800 by appropriately triggering the switching unit 813, which results in the spark being extinguished.

Similar to the field device 100 shown in FIG. 4, which cannot be used for monitoring, the connection of the input terminal 110 and output terminal 111 in the monitoring field device 800 shown in FIG. 5 is inter alia realized via a current branch leading to the output terminal 111 or to the switching device 180 and formed by internal electrical conductors 171. In contrast to the field device 100 of FIG. 4, however, the relevant current branching in the monitoring field device 800 of FIG. 5 is not embodied between the input terminal 110 and the decoupling device 200, but instead downstream of the decoupling device 200, and thus between the decoupling device 200 and the power limiting device 300. As a result, the electrical energy intended to be forwarded through the output terminal 111 is not extracted upstream of the decoupling device 200, but instead downstream of the decoupling device 200. In this way, the connection of the input terminal 110 and output terminal 111 in the monitoring field device 800 of FIG. 5 comprises the decoupling device 200, whereas this is not the case in the field device 100 of FIG. 4.

This embodiment of the monitoring field device 800 is based on the above-mentioned monitoring of the system 50, which is carried out in a divided form, according to which separate system sections of the system 50 are monitored with the aid of the feed-in device 400 and the monitoring field devices 800. The decoupling device 200 of the monitoring field device 800 of FIG. 5 serves as the end termination or termination impedance of such a monitored system section. Depending on the embodiment of the system 50 and on the arrangement of the monitoring field device 800 within the system 50, the relevant system section may be monitored by the feed-in device 400 arranged upstream of the monitoring field device 800, or by a further monitoring field device 800 arranged upstream of the monitoring field device 800 being considered.

With the aid of the decoupling device 200 terminating a system section, it may be achieved that circuit components downstream of the decoupling device 200 do not have any influence on the detection of spark generation at the respective system section. According to the embodiment of the monitoring field device 800 shown in FIG. 5, the current branch leading to the output terminal 111 is embodied downstream of the decoupling device 200. In this way, the decoupling device 200 is arranged between the input terminal 110 and the monitoring device 810, and the monitoring device 810 is thus downstream of the decoupling device 200. The same applies to the optional forwarding limiting device 305, which is also arranged downstream of the decoupling device 200. This prevents the monitoring device 810 and the forwarding limiting device 305 from influencing or interfering with the detection of spark generation.

Figure 6:
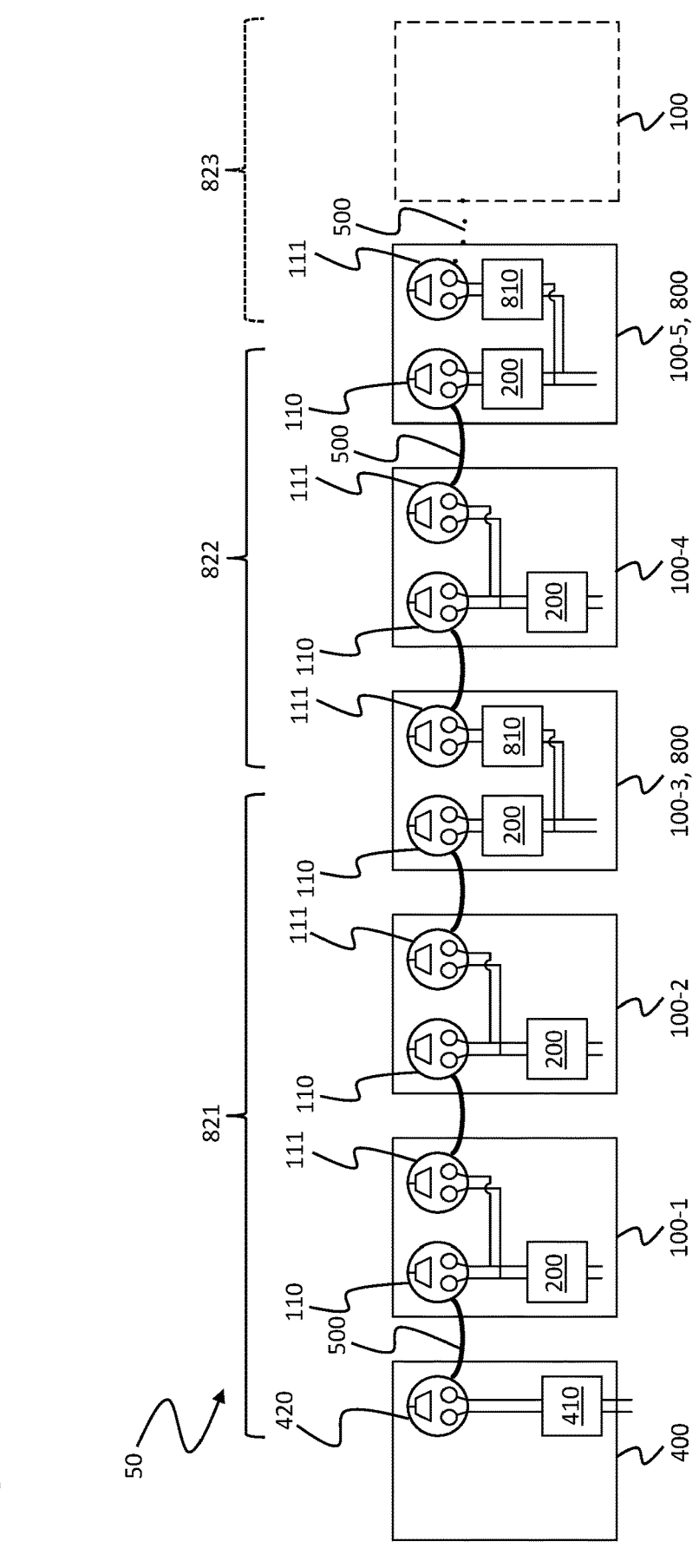
FIG. 6 is a depiction of the system having a plurality of system sections monitored.

For further illustration, FIG. 6 shows a further depiction of the system 50 with the feed-in device 400 and the first to fifth field devices 100-1, 100-2, 100-3, 100-4, 100-5. As indicated in FIG. 6, (at least) one further field device 100 may be downstream of the fifth field device 100-5. The third and fifth field devices 100-3, 100-5 are realized in the form of monitoring field devices 800. The feed-in device 400, together with the third and fifth field devices 100-3, 100-5 implemented as monitoring field devices 800, serves to detect spark generation in the electrical energy supply and, based on this, to switch off the electrical energy supply. As shown in FIG. 6, a first system section 821 of the system 50 may be monitored by the feed-in device 400. The third field device 100-3 may be used to monitor a second system section 822. A third system section 823 may be monitored by the fifth field device 100-5, provided that (at least) one further field device 100 is arranged downstream thereof. In the event that at least one further downstream monitoring field device 800 is additionally used, at least one further system section may be monitored by the relevant monitoring field device 800.

The monitoring of the first to third system sections 821, 823, 823 may relate to the input and output terminals 110, 111 of the field devices 100 encompassed by or located in the respective system section and the supply lines 500 connected thereto. In this respect, the monitoring of the first system section 821 implemented by the feed-in device 400 or the feed-in device monitoring device 410, as may be seen from FIG. 6, relates to the input and output terminals 110, 111 of the first and second field devices 100-1, 100-2, the input terminal of the third field device 100-3, and the supply lines 500 via which the feed-in device 400 is connected to the first field device 100-1, the first field device 100-1 is connected to the second field device 100-2, and the second field device 100-2 is connected to the third field device 100-3. The feed-in device output terminal 420 may also fall under monitoring by the feed-in device monitoring device 410. The decoupling device 200 of the third field device 100-3 may serve as a terminating impedance of the first monitored system section 821. In this way, the monitoring of the first system section 821 may be removed from being influenced by the monitoring device 810 (and the forwarding limiting device 305, if present, cf. FIG. 5) of the third field device 100-3.

The monitoring of the second system section 822 by the third field device 100-3 or by its monitoring device 810 relates to the output terminal 111 of the third field device 100-3, the input and output terminals 110, 111 of the fourth field device 100-4, the input terminal 110 of the fifth field device 100-5, and the supply lines 500 via which the third field device 100-3 is connected to the fourth field device 100-4 and the fourth field device 100-4 is connected to the fifth field device 100-5, as may be seen from FIG. 6. The decoupling device 200 of the fifth field device 100-5 may serve as the terminating impedance of the second monitored system section 822. In this way, the monitoring of the second system section 822 cannot be influenced by the monitoring device 810 (and the forwarding limiting device 305, if present, cf. FIG. 5) of the fifth field device 100-5.

The monitoring of the third system section 823 by the fifth field device 100-5 or by its monitoring device 810 relates to the input and output terminals 110, 111 encompassed by the third system section 823, i.e. (at least) the output terminal 111 of the fifth field device 100-5 and the input terminal 110 of a further field device 100, as well as the supply line 500 connecting these field devices 100. Provided that additional field devices 100 are present, the monitoring of the third system section 823 may relate to a larger number of input and output terminals 110, 111 and supply lines 500. The termination of the third system section 823 may be a decoupling device 200 of a field device 100.

With regard to the electrical energy supply, the system 50 thus uses different protection mechanisms, each of which provides a high level of safety, thus allowing for the scenario of use shown in FIG. 2. With the aid of the feed-in device monitoring device 410 of the feed-in device 400 and the monitoring devices 810 of the field devices 100 configured as monitoring field devices 800 (cf. FIGS. 3 and 5), a spark occurring in the electrical energy supply due to a fault in the area of the input terminals 110 and output terminals 111 of the field devices 100 and in the area of the supply lines 500 connected thereto may be reliably detected in its generation, and on this basis the electrical energy supply may be switched off with a low latency in order to extinguish the spark. The spark duration limitation achieved in this way prevents the generation of an ignition spark with sufficient energy for ignition in the area of the input terminals 110, output terminals 111 and supply lines 500. In this way, the field devices 100 may be arranged in zone 1/21 in accordance with the ATEX directive (second area 11 in FIG. 2).

The embodiment of the field devices 100 comprising the first and second device sections 101, 102 and the power limiting device 300 (cf. FIGS. 4 and 5) may cause a limitation of the maximum electrical power that may be transmitted from the first device section 101 to the second device section 102. This may ensure with a high degree of reliability that the available electrical energy is limited in such a way that, in the event of a fault, no ignition spark with sufficient energy for ignition may be generated in the region of the terminal devices 160 or output line terminals 165 of the second device sections 102 of the field devices 100, the output lines 510 and the field components 600 connected to the field devices 100 via the output lines 510. Therefore, the field components 600 may be located in zone 0/20 as defined by the ATEX directive (first area 10 in FIG. 2).

Monitoring the electrical energy supply to the field devices 100 and power limiting within the field devices 100 further provides the opportunity of providing simple and inexpensive designs for the supply lines 500 and output lines 510, and for the connectors disposed on the lines 500, 510. It is also possible to introduce relatively large electrical power into the field devices 100.

Furthermore, due to the embodiment of the system 50 in such a way that the monitoring of the electrical energy supply is carried out section by section with the aid of the feed-in device 400 and the monitoring field devices 800, it may be achieved that parameters such as line lengths of supply lines 500, capacitive and/or inductive effects and associated restrictions relate only to the individual system sections and not to the entire system 50. This makes it possible to provide an embodiment with relatively large line lengths and/or numbers of field devices 100 for the system wherein reliable monitoring of the energy supply may also be ensured in such an embodiment. The respective embodiment of the system 50 may, if necessary, be limited by the total current transported within the system 50.

The following describes other features and details that may be contemplated for components of the system 50 such as the field devices 100.

Figure 7:
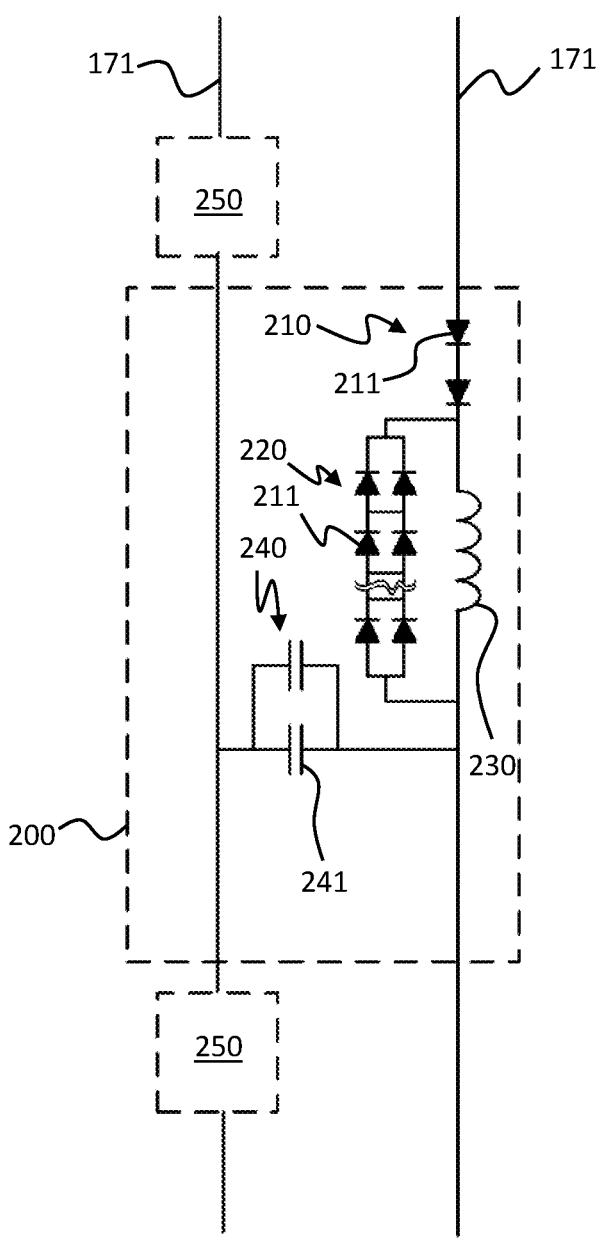
FIG. 7 shows a decoupling device of a field device.

FIG. 7 shows a possible embodiment of the decoupling device 200. The decoupling device 200 comprises an LC low-pass filter with an inductor 230 and a capacitive assembly 240, which is connected in parallel to one end of the inductor 230 and via which a line path comprising the inductor 230 is connected to a further line path. At an end of the inductor 230 opposite thereto is a further assembly 210 connected in series with the inductor 230. According to the embodiment shown in FIG. 7, the further assembly 210 comprises two serially connected diodes 211, and may therefore also be referred to as a diode assembly. A further component of the decoupling device 200 is a voltage limiting device connected in parallel with the inductor 230, which according to the embodiment shown in FIG. 7 is realized as a clamping circuit 220 comprising two strings of serially connected diodes 211, the strings and the diodes 211 being connected in parallel with one another. The capacitive assembly 240 has two capacitors 241 connected in parallel with each other.

The predetermined input impedance of a field device 100 or the termination impedance of a monitored system section of the system 50 is predetermined by the inductor 230 and the capacitive assembly 240 of the decoupling device 200. The further assembly 210 is used to specify a current flow direction. The voltage limiting device or clamping circuit 220 is used to preset a maximum voltage drop across the inductor 230 and to convert the excess voltage into heat in the event of a voltage excess, for example due to a break in an internal electrical conductor 171 at an end of the inductor 230.

FIG. 7 further illustrates the possibility of forming the field devices 100 of the system 50 with an inrush current limiter 250. The inrush current limiter 250 may also be located in the first device section 101. The inrush current limiter 250 may be arranged on the input side of the decoupling device 200 or between the decoupling device 200 and the input terminal 110, and thus be arranged upstream of the decoupling device 200, as indicated in FIG. 7 by a position above the decoupling device 200. Alternatively, the inrush current limiter 250 may be provided on the output side of the decoupling device 200 or between the decoupling device 200 and the power limiting device 300 and thus be arranged downstream of the decoupling device 200, as indicated in FIG. 7 by a position below the decoupling device 200.

The inrush current limiter 250 is configured to limit an inrush current at a start of the electrical energy supply. In this way, it may be avoided that a high or excessive inrush current occurs at one or a plurality of field devices 100 at the beginning of the electrical energy supply with the consequence that the feed-in device 400 or a monitoring field device 800 of the system erroneously switches off the energy supply, although no spark generation is present. The inrush current limiter 250 may e.g. be used to achieve slow charging of any local capacitors present.

The inrush current limiter 250 may comprise a series circuit of a resistor and a transistor, and additionally a regulator. With the aid of the regulator, the current flowing across the resistor may be measured and, depending on this, the voltage drop across the transistor may be regulated by appropriately controlling a gate of the transistor in such a way that the occurrence of an excessive current is avoided.

Figure 8:
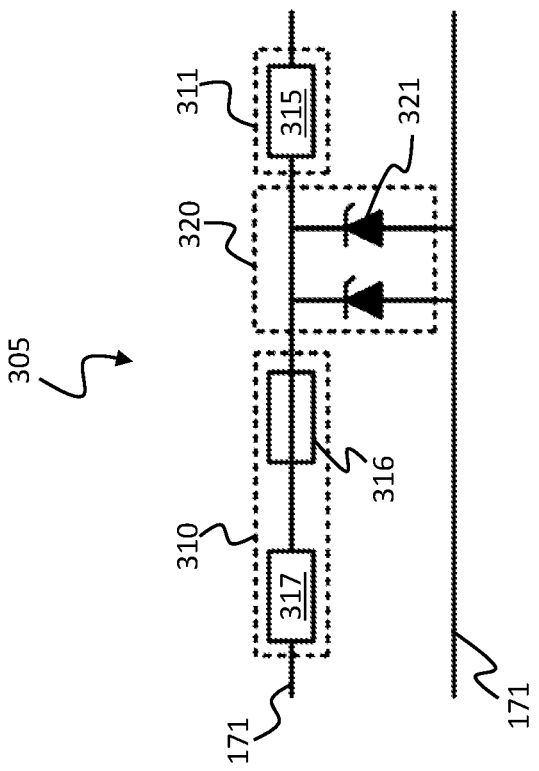
FIG. 8 depicts a forwarding limiting device of a monitoring field device.

FIG. 8 shows a possible embodiment of the forwarding limiting device 305 of a monitoring field device 800, with the aid of which a current limitation and a voltage limitation may be caused. The forwarding limiting device 305 comprises a protective device 310 arranged on the input side, a voltage limiting device 320 arranged downstream of the protective device 310, and a current limiting device 311 arranged on the output side downstream of the voltage limiting device 320. The protection device 310, which is connected in series with the current limiting device 311, comprises an optional protective resistor 317 and a fuse 316 connected in series with the protective resistor 317. The protective resistor 317 may also be omitted. The current limiting device 311 comprises a resistor 315. The voltage limiting device 320, via which a line path comprising the protective device 310 and the current limiting device 311 is connected to a further line path comprising only an internal electrical conductor 171 as shown in FIG. 8, comprises two voltage-limiting components connected in parallel with each other, which in the present case are in the form of Zener diodes 321.

In the forwarding limiting device 305 of FIG. 8, the resistor 315 of the current limiting device 311 is used to effect current limiting. Via the fuse 316 and the optional protective resistor 317 of the protective device 310, protection of the voltage limiting device 320 or of its Zener diodes 321 may be achieved. With respect to voltage limiting, the Zener diodes 321 are operated in the reverse direction so that the voltage applied to the two line paths is limited to a limit voltage specified by the Zener diodes 321. In the event that the voltage exceeds the limit, the Zener diodes 321 become conductive, allowing the excess voltage to be converted to heat.

The power limiting device 300 of a field device 100 (cf. FIGS. 4 and 5), which serves to limit the electrical power transmissible from the first device section 101 to the second device section 102 as indicated above, may be constructed according to the circuit diagram shown in FIG. 8. In this way, it is possible to cause a shared current limitation and voltage limitation with respect to the output line terminals 165 of the associated terminal device 160.

Furthermore, other designs may be considered for the power limiting device 300. For example, the power limiting device 300 may be embodied with a galvanic isolation. Furthermore, the power limiting device 300 may be configured to effect a plurality of separate and optionally different current limitations and/or a plurality of separate and optionally different voltage limitations with respect to individual or a plurality of output line terminals 165 (each not shown).

For the feed-in device limiting device 403 of the feed-in device 400 (cf. FIG. 3), a design according to the circuit diagram shown in FIG. 8 is conceivable, as well.

As indicated above, in addition to providing an electrical energy supply to the field devices 100 and the field components 600 connected thereto, the system 50 is also used to carry out data communication, for example to transmit control data or control signals that may be output by the superordinate controller 700 to actuators, and to receive sensor data or sensor signals from sensors and transmit them to the controller 700.

For this purpose, the field devices 100 may have a structure and components as shown in FIG. 4 for a field device 100 that cannot be used for monitoring and in FIG. 5 for a field device 100 configured as a monitoring field device 800. Here, the field device 100 or the first device section 101 comprises a first communication terminal 120, a second communication terminal 121, and a communication controller 150. The communication controller 150 may be monolithic or discrete. Data signals may be transmitted and received via the first communication terminal 120, as well as via the second communication terminal 121. The first communication terminal 120 is connected to the communication controller 150 via a first barrier circuit 140, a first physical interface 145, and internal data lines 176 of the field device 100. The second communication terminal 121 is connected to the communication controller 150 via a second barrier circuit 141, a second physical interface 146, and internal data lines 176. This allows the communication controller 150 to send and receive data signals via both the first communication terminal 120 and the second communication terminal 121.

The internal data lines 176 of the field device 100 shown in FIGS. 4 and 5 may comprise a plurality of electrical conductors, for example in the form of conductive paths. The first and second barrier circuits 140, 141 are configured to limit an electrical power transmittable to the first and second communication terminals 120, 121, respectively, of the first device section 101 in the course of data communication and/or to cause galvanic isolation. As a result, an occurrence of an ignition spark with energy sufficient for ignition in the area of the communication terminals 120, 121 due to the data communication may be prevented. In this way, a high level of safety may be achieved with respect to data communication, which makes it possible to place the field devices 100 in zone 1/21 of the ATEX directive (second zone 11 according to FIG. 2) with respect to the scenario of use shown in FIG. 2.

For the purpose of power limitation, the first and second barrier circuits 140, 141 may comprise electrical components such as at least one diode and at least one resistor. A galvanic isolation may be realized with an embodiment of the first and second barrier circuits 140, 141 comprising a transformer or a capacitor (each not shown). The first and second physical interfaces 145, 146, which may be configured as physical interface components, are used for processing, i.e., encoding and decoding, respectively, data signals. As the case may be, the first and second physical interfaces 145, 146 may each have an additional energy-limiting barrier circuit.

FIGS. 4 and 5 further show that the input terminal 110 is realized as a hybrid terminal, which comprises the first communication terminal 120. In a corresponding manner, the output terminal 111 is realized as a further hybrid terminal which comprises the second communication terminal 121. In this embodiment, the input terminal 110 and output terminal 111 may be used to feed in or transmit electrical energy for energy supply as well as to transmit data signals. Correspondingly, the supply lines 500 connected to the input terminal 110 and output terminal 111 (cf. FIG. 1) may simultaneously function as data lines via which electrical energy for energy supply and data signals may be transmitted. Matched to this, the supply lines 500 may have corresponding electrical conductors or cores for data transmission, and the connectors provided at the ends of the supply lines 500 may have communication connections corresponding to the communication connections 120, 121. As a result, the wiring complexity of the system 50 may be kept low.

The field devices 100 of the system 50 or their communication controllers 150 may receive and transmit data signals via the input terminal 110 and the output terminal 111. In this way, data communication is possible between the field devices 100 among one another and between the field devices 100 and the feed-in device 400. The latter may take place via the first field device 100-1 of the system 50, which is connected to the feed-in device 400 via a supply line 500 connected to the input terminal 110, as shown in FIG. 1.

FIGS. 4 and 5 further show that the communication controller 150 of the first device section 101 is connected to the terminal device 160 of the second device section 102 or the input/output controller 161, respectively, via a communication connection 175. Due to this, the communication controller 150 may receive and transmit data signals via the terminal device 160. In this way, data communication is possible between the communication controller 150 and field components 600, which may be connected to output line terminals 165 of the terminal device 160 via output lines 510 (cf. FIG. 1). Data communication may be carried out via the input/output controller 161 of the terminal device 160.

As shown in FIGS. 4 and 5, in addition to corresponding internal data lines of the field device 100, which may comprise electrical conductors in the form of conductive paths, the communication connection 175 comprises a barrier device 155. The barrier device 155 is configured to cause a limitation of an electrical power transmittable from the communication controller 150 to the terminal device 160 during a data communication and/or a galvanic isolation.

The use of the barrier device 155 in the field devices 100 of the system 50 also serves to provide a high level of security with respect to the data communication. With the aid of the barrier device 155, it may be achieved that the electrical power which may be introduced into the second device sections 102 of the field devices 100 in the course of the data communication is limited. This may ensure that, as a result of the data communication, no ignition spark with sufficient energy for ignition may be caused in the region of the terminal devices 160 or output line terminals 165 of the second device sections 102 of the field devices 100, the output lines 510 and the field components 600 connected to the field devices 100 via the output lines 510. As a result, the field components 600 may be located in zone 0/20 of the ATEX directive (first area 10 according to FIG. 2), and the field devices 100 may be located in zone 1/21 of the ATEX directive (second area 11 according to FIG. 2), according to the scenario of use illustrated in FIG. 2.

The barrier device 155 of the communication connection 175 may be in the form of a digital isolator such as an optocoupler or a magnetic coupler. In such an embodiment, reliable and safe power limiting may be achieved by the barrier device 155 together with galvanic isolation.

The input/output controller 161 of the field device 100 shown in FIGS. 4 and 5, via which the communication controller 150 may communicate with field components 600, may be configured to control the transmission and reception of data signals via the terminal device 160 or via its output line terminals 165. Such data signals may be previously received by the input/output controller 161 from the communication controller 150, or subsequently forwarded to the communication controller 150, via the communication connection 175.

Here, data signals (e.g. control data) coming from the communication controller 150 and received by the input/output controller 161 may be forwarded to field components 600 (for example, actuators) using the input/output controller 161. Furthermore, data signals (e.g. sensor data) coming from field components 600 (for example, sensors) and received by the input/output controller 161 may be further sent to the communication controller 150 using the input/output controller 161. As the case may be, the input/output controller 161 may also convert or process the data signals received in each case before they are sent on.

The input/output controller 161 may further be configured to control a forwarding of electrical energy to field components 600 via the output line terminals 165 carried out as part of the electrical energy supply. In this way, the distribution of electrical energy via the terminal device 160 may be flexibly determined. This may be controlled, for example, by the communication controller 150, which may transmit appropriate data signals or control data to the input/output controller 161 for this purpose. Such control data may be generated by the superordinate controller 700 of the system 50, or may be based on control data generated by the controller 700. In the aforementioned cases, communication between the communication controller 150 and the input/output controller 161 may occur in accordance with a predetermined communication protocol and via interfaces of the communication controller 150 and the input/output controller 161 that are not shown.

Also, the actuation of the switching device 180 shown in FIGS. 4 5 for forwarding the electrical energy via the output terminal 111 of the field device 100 may be carried out, for example, with the aid of the communication controller 150. This may also be based on control data generated by the superordinate controller 700, which may be received by the communication controller 150.

The feed-in device 400 of the system 50 is comprised as part of the data communication, as indicated above. For this purpose, the setup for the feed-in device 400 shown in FIG. 3 may be used. Here, the feed-in device 400 comprises a communication input 405. Via the communication input 405, which may be realized in the form of a terminal of the feed-in device 400, and a data line, which is only indicated by dashed lines in FIG. 3, the feed-in device 400 may be connected to the superordinate controller 700 of the system 50. In this way, the feed-in device 400 may receive data signals from the controller 700 and transmit them to the controller 700. The feed-in device 400 further comprises a feed-in device communication terminal 425 via which data signals may be transmitted and received, and via which the feed-in device 400 may communicate with the field devices 100, i.e. with the first field device 100-1 and via the latter with the other field devices 100 (cf. FIG. 1). A further component is a feed-in device communication controller 450, which is connected to the communication input 405 via a first physical feed-in device interface 445 and internal data lines 476 of the feed-in device 400. The feed-in device communication controller 450 is connected to the feed-in device communication terminal 425 via a second physical feed-in device interface 446, a feed-in device barrier circuit 430, and internal data lines 476. In this manner, the feed-in device communication controller 450 may transmit and receive data signals via the communication input 405 and via the feed-in device communication terminal 425.

The first and second physical feed-in device interfaces 445, 446 are configured to encode and decode data signals, respectively. The feed-in device barrier circuit 430 is configured to limit an electrical power that may be transmitted to the feed-in device communication terminal 425 in the course of data communication and/or to cause galvanic isolation. This may further promote safe performance of the data communication. The feed-in device barrier circuit 430 may comprise components such as at least one diode and at least one resistor for power limiting and/or a transformer or capacitor for galvanic isolation.

According to the field devices 100, the feed-in device output terminal 420 is implemented in the form of a hybrid terminal that comprises the feed-in device communication terminal 425. Therefore, the feed-in device output terminal 420 may be used to transmit electrical energy and data signals. Furthermore, a supply line 500 configured in the form of a hybrid line may be connected to the feed-in device output terminal 420, which may comprise a connector having a communication terminal corresponding to the feed-in device communication terminal 425. Via this, the feed-in device 400 may be connected to one of the field devices 100 (or, according to FIG. 1, to the first field device 100-1) to allow for transmitting electrical energy and exchanging data signals.

The structure of the feed-in device 400 shown in FIG. 3 allows for carrying out data communication between the feed-in device 400 and the controller 700, as well as between the feed-in device 400 and the field devices 100 (via the first field device 100-1, cf. FIG. 1). The field devices 100 may also communicate with one another, as well as with the field components 600 connected thereto. In this way, data communication is possible between the controller 700 and the field components 600 via the feed-in device 400 and the field devices 100.

In the following, further possible variants and embodiments are described, which may be considered for components of the system 50 such as the field devices 100 or monitoring field devices 800. Matching features and details as well as identical and equally acting components are not described again in detail in the following. Instead, reference is made to the above description for details thereof. Furthermore, aspects and details mentioned with respect to one embodiment may also be applied with respect to another embodiment, and features of two or more embodiments may be combined.

Figure 9:
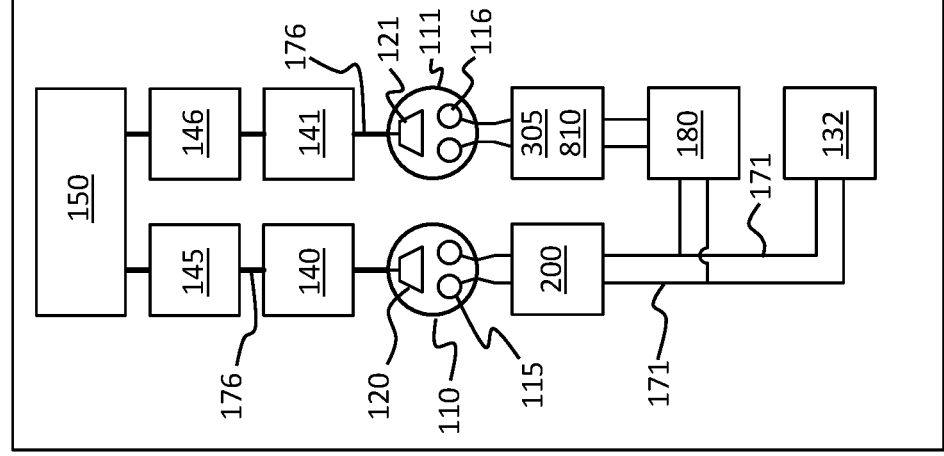
FIG. 9 is an illustration of a monitoring field device according to a further embodiment, in which the monitoring field device comprises an input terminal and an output terminal.
Figure 9:
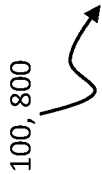

FIG. 9 shows an illustration of a monitoring field device 800 according to a second embodiment. Unlike the design shown in FIG. 5, the monitoring field device 800 shown in FIG. 9 does not have a terminal device 160. In this way, the monitoring field device 800 cannot be connected to a field component 600. Correspondingly, the monitoring field device 800 of FIG. 9 lacks the division into the first and second device sections 101, 102, and omits components such as the energy supply connection 170 with the power limiting device 300 and the communication connection 175 with the barrier device 155. The separating device 131 may also be omitted.

Apart from this, the design of the monitoring field device 800 of FIG. 9 corresponds to that of FIG. 5, i.e. the monitoring field device 800 comprises components such as the input terminal 110, the output terminal 111, internal electrical conductors 171, the decoupling device 200, the switching device 180, the monitoring device 810, the optional forwarding limiting device 305 and the internal power supply device 132. According to the design shown in FIG. 5, the input and output terminals 110, 111 are interconnected via internal electrical conductors 171 and, starting from the input terminal 110 and in a sequential manner, via the decoupling device 200, the switching device 180, the optional forwarding limiting device 305 and the monitoring device 810.

Electrical energy provided by the feed-in device 400 may be fed into the monitoring field device 800 via the input terminal 110, and forwarded to a subsequent field device 100 via the output terminal 111. The switching device 180 may be used to control the forwarding of electrical energy via the output terminal 111. The forwarding limiting device 305 may be used to cause a limitation of the electrical power that may be transmitted during the forwarding via the output terminal 111. The monitoring device 810 is used to detect a spark occurring in the electrical energy supply of at least one subsequent field device 100 by forwarding the electrical energy due to a fault, and to shut off the electrical energy supply based on this. The monitoring device 810 may be used to monitor a system section of the system 50 in this manner, as indicated above. The decoupling device 200 may act as a terminating impedance of another system section of the system which may be monitored by the feed-in device 400 or another upstream monitoring field device 800.

The monitoring field device 800 shown in FIG. 9 may also be used for data communication, and accordingly comprises components such as first and second communication terminals 120, 121, first and second barrier circuits 140, 141, first and second physical interfaces 145, 146, and communication controller 150. The communication controller 150 may transmit and receive data signals via the first and second communication terminals 120, 121. This allows for data communication between the monitoring field device 800 and components of the system 50, such as the feed-in device 400 and one or a plurality of field devices 100. In this context, the monitoring field device 800 may be used, for example, to refresh data signals that may be transmitted or forwarded via the monitoring field device 800.

Figure 10:
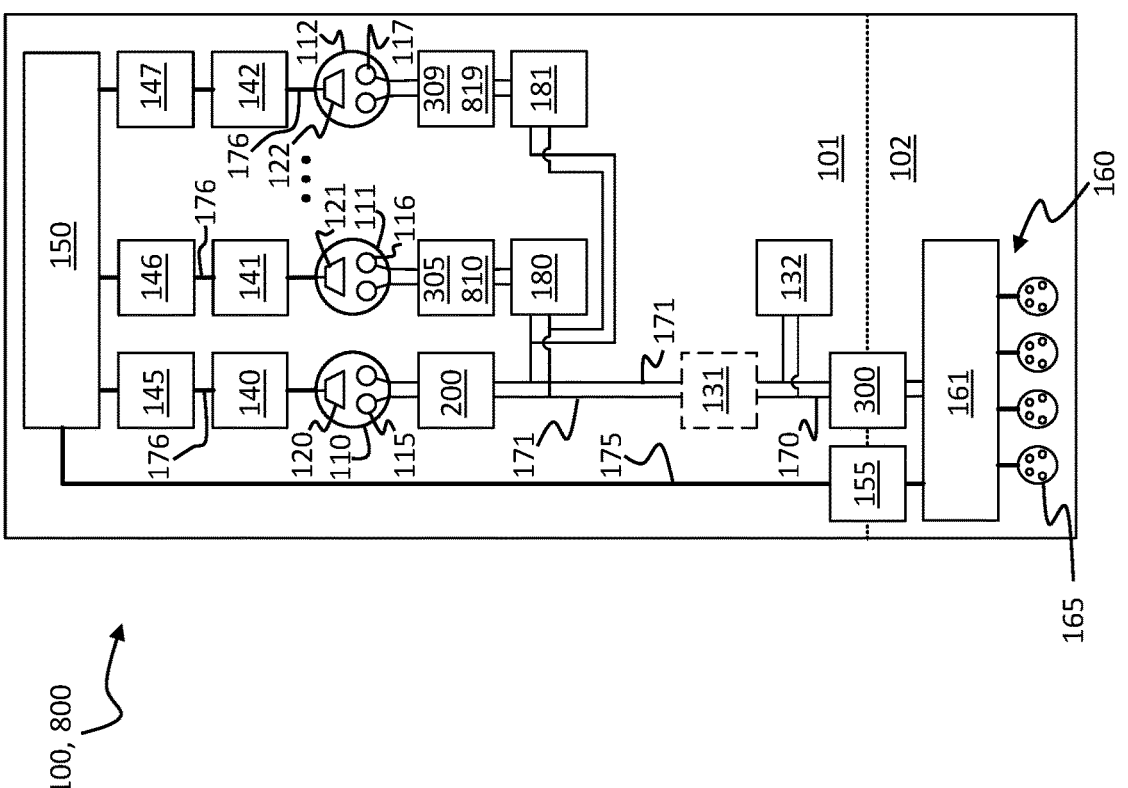
FIG. 10 is an illustration of a monitoring field device according to a further embodiment in which the monitoring field device comprises an input terminal, a plurality of output terminals, and connection device for connecting field components.

FIG. 10 shows an illustration of a monitoring field device 800 according to a third embodiment. The monitoring field device 800 of FIG. 10 is to a large extent identical to the monitoring field device 800 shown in FIG. 5 and differs from it in that the monitoring field device 800 of FIG. 10 or its first device section 101 comprises (at least) one further output terminal 112. The further output terminal 112 is configured as a hybrid terminal corresponding to the output terminal 111 and, in addition to terminal contacts 117 used in the context of the electrical energy supply, comprises a further communication connection 122. By this, the further output terminal 112 corresponding to the other output terminal 111 may be used for data communication and may further be used to forward the electrical energy introduced into the monitoring field device 800 via the input terminal 110 to a downstream field device 100.

In the monitoring field device 800 of FIG. 10, corresponding to the design shown in FIG. 5, the output terminal 111 is associated with the switching device 180, the optional forwarding limiting device 305 and the monitoring device 810. Here, too, the input terminal 110 and the output terminal 111 are connected to each other via internal electrical conductors 171 and, starting from the input terminal 110 and in successive manner, via the decoupling device

200, the switching device 180, the optional forwarding limiting device 305 and the monitoring device 810. The monitoring device 810 may be used to monitor a system section of the system 50.

With reference to the further output terminal 112, the monitoring field device 800 illustrated in FIG. 10 or its first device section 101 comprises a further switching device 181, a further optional forwarding limiting device 309 and a further monitoring device 819, these components being associated with the further output terminal 112. The further monitoring device 819 is configured in accordance with the monitoring device 810. In this respect, the embodiment as shown in FIG. 5 for the monitoring device 810 and as described above may also be applied to the further monitoring device 819. The further optional forwarding limiting device 309 may be designed according to the forwarding limiting device 305, and thus according to the circuit diagram shown in FIG. 8. The forwarding limiting devices 305, 309 may also be omitted. Corresponding to the connection between the input and output terminals 110, 111, the input terminal 110 and the further output terminal 112 are interconnected via internal electrical conductors 171 and, starting from the input terminal 110 and in successive manner, via the decoupling device 200, the further switching device 181, the further optional forwarding limiting device 309 and the further monitoring device 819.

With the aid of the further switching device 181, the forwarding of the electrical energy via the further output terminal 112 may be controlled. Using the further forwarding limiting device 309, a limitation of the electrical power transmittable during the forwarding via the further output terminal 112 may be achieved. Using the further monitoring device 819, a spark occurring in the electrical energy supply of at least one subsequent field device 100 by forwarding the electrical energy via the further output terminal 112 as a result of a fault may be detected, and based on this, the electrical energy supply may be turned off. With the aid of the further monitoring device 819, a further system section of the system 50 may be monitored in this way.

In the monitoring field device 800 of FIG. 10, the decoupling device 200 may again form a termination of a system section of the system 50, which may be monitored by the feed-in device 400 or another upstream monitoring field device 800. In this way, interference with the monitoring of this system section by the monitoring devices 810, 819 and the optional forwarding limiting devices 305, 309 of the monitoring field device 800 may be avoided.

With respect to data communication, the monitoring field device 800 shown in FIG. 10 or its first device section 101 is configured such that the further communication terminal 122 of the further output terminal 112 is connected to the communication controller 150 of the monitoring field device 800 via a further barrier circuit 142, a further physical interface 147 and internal data lines 176. In this way, the communication controller 150 may also transmit and receive data signals via the further communication terminal 122. The further barrier circuit 142 is configured in accordance with the first and second barrier circuits 140, 141 to limit an electrical power that may be transmitted to the further communication terminal 122 in the course of data communication and/or to cause galvanic isolation. The further physical interface 147 is used for processing, i.e. encoding or decoding, data signals.

The monitoring field device 800 shown in FIG. 10 may be connected to two further field devices 100 via the first output terminal 111 and the further output terminal 112, and using two supply lines 500 connected thereto. Both output terminals 111, 112 and the corresponding supply lines 500 may be used to forward electrical energy and communicate data. In this context, the monitoring field device 800 shown in FIG. 10 may be used as a distributor for electrical energy and data communication. Using one or a plurality of monitoring field devices 800 as shown in FIG. 10, a system 50 with a plurality of branched rows or strings of field devices 100 may be constructed. In this context, a monitoring field device 800 configured according to FIG. 10 may monitor a plurality of or two system sections of the system 50 starting from the field device 800 with the aid of the monitoring devices 810, 819 (not shown in each case).

With reference to the monitoring field device 800 shown in FIG. 10, it is further possible to provide a plurality of further output terminals 112 each having a further communication terminal 122, and correspondingly a plurality of further barrier circuits 142 and physical interfaces 147 for respectively connecting the further communication terminals 122 to the communication controller 150, as indicated in FIG. 10 by dots in an area between the barrier circuits 141, 142. In a corresponding manner, a plurality of further switching devices 181, a plurality of further optional forwarding limiting devices 309, and a plurality of monitoring devices 819 may be provided, via each of which the input terminal 110 and each of the further output terminals 122 are connected to separately control, or with respect to each of the further output terminals 112, the forwarding of electrical energy, limit the transmissible electrical energy, and achieve monitoring of the electrical energy supply. In this embodiment, each of the further output terminals 112 may have associated therewith a further switching device 181, a further forwarding limiting device 309, and a further monitoring device 819. In this embodiment, a plurality of system sections of the system 50 may be monitored using the monitoring device 810 and the further monitoring devices 819.

Figure 11:
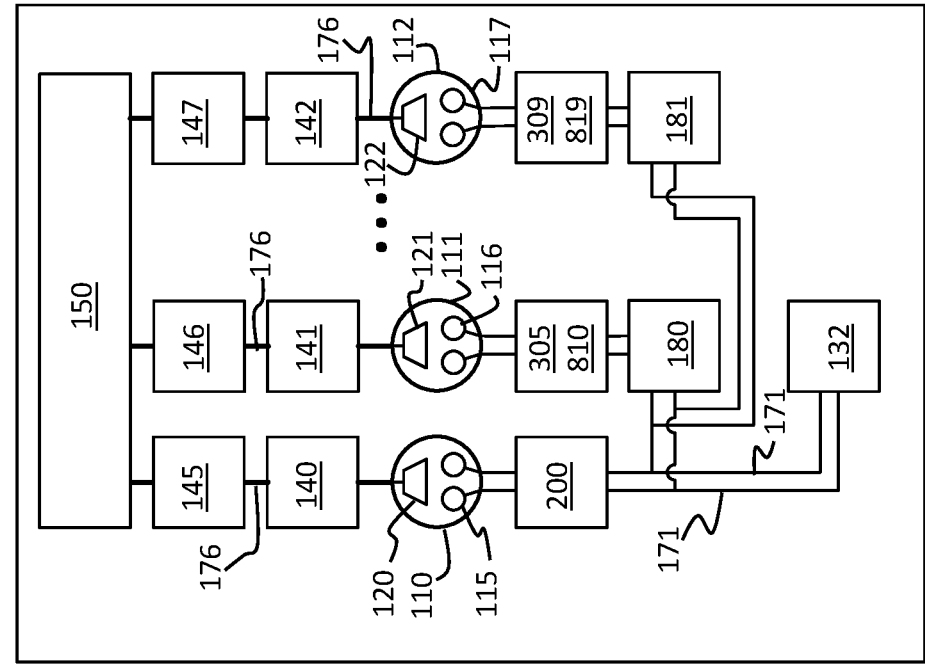
FIG. 11 is an illustration of a monitoring field device according to a further embodiment, in which the monitoring field device comprises an input terminal and a plurality of output terminals.
Figure 11:
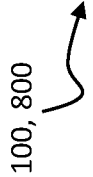

FIG. 11 shows an illustration of a monitoring field device 800 according to a fourth embodiment. This embodiment corresponds to the embodiment shown in FIG. 10 in that the monitoring field device 800 of FIG. 11 comprises (at least) one further output terminal 112, but differs from FIG. 10 in that the monitoring field device 800 of FIG. 11, corresponding to the embodiment shown in FIG. 9, does not comprise a terminal device 160. In this way, the monitoring field device 800 cannot be connected to a field component 600. Correspondingly, the monitoring field device 800 of FIG. 11 lacks the division into the first and second device sections 101, 102, and omits components such as the energy supply connection 170 comprising the power limiting device 300 and the communication connection 175 comprising the barrier device 155. The separating device 131 may also be omitted.

Apart from this, the structure of the monitoring field device 800 of FIG. 11 is the same as that of FIG. 10. Therefore, the monitoring field device 800 may also be used as a distributor for electrical energy supply and data communication. In this context, the electrical energy introduced into the monitoring field device 800 via the input terminal 110 may be forwarded via the output terminals 111, 112 for the purpose of supplying energy to further field devices 100. The switching device 180, 181 may be used to control the forwarding of electrical energy via output terminals 111, 112. With the aid of the optional forwarding limiting devices 305, 309, a limitation of the electrical power that may be transmitted during forwarding via the output terminals 111, 112 may be achieved.

With the aid of the monitoring devices 810, 819, spark generation may be detected in the event of a fault and the electrical energy supply may be switched off on this basis. In this manner, a plurality of system sections of the system 50 originating from the field device 800 may be monitored using the monitoring devices 810, 819. The decoupling device 200 may form a termination of another system section of the system 50, which may be monitored by the feed-in device 400 or another upstream monitoring field device 800. With reference to data communication, the communication controller 150 may transmit and receive data signals via the input and output terminals 110, 111, 112 and associated communication terminals 120, 121, 122, respectively. This may e.g. comprise refreshing data signals that may be forwarded via the monitoring field device 800.

With respect to data communication, it is possible to further provide the following embodiment with respect to field devices 100 of system 50. The field devices 100 may be configured to carry out data communication via the communication terminals 120, 121, 122 and the physical interfaces 145, 146, 147 according to a first communication protocol, and to carry out data communication via the terminal device 160 (if present) according to a second communication protocol different from the first communication protocol. For this purpose, the terminal device 160 or the input/output controller 161 may have corresponding interfaces or physical interfaces. In this way, data communication between the field devices 100 and the field components 600 may be decoupled from the rest of the data communication, which may comprise data exchange between the field devices 100 themselves and between the field devices 100 and the superordinate controller 700 via the input device 400.

The first communication protocol may e.g. refer to an Ethernet communication with a data transfer rate of e.g. 100 MBit, such as EtherCAT. The second communication protocol may for example refer to a communication according to HART or Profibus PA. Furthermore, the second communication protocol may also refer to an Ethernet communication, wherein, in contrast to the first Ethernet communication protocol, a smaller data transmission rate of e.g. 10 MBit may be used. In this context, internal components of the terminal device 160 or the input/output controller 161 used for data communication may be configured according to the future APL (Advanced Physical Layer) standard, if applicable.

With respect to the scenario of use illustrated in FIG. 2, the following features may further apply to the field devices 100 of the system 50. The input terminals 110 and output terminals 111, 112, may be configured according to a first type of ignition protection, and the output line terminals 165 (if present) may be configured according to a second type of ignition protection, wherein the second type of ignition protection corresponds to a larger level of protection than the first type of ignition protection. The second type of ignition protection may be the intrinsic safety Ex is type of ignition protection, and the first type of ignition protection may be the intrinsic safety Ex ib type of ignition protection.

In order to fulfill the different types of ignition protection, components such as internal components and electrical conductors in the area of the respective connections 110, 111, 112, 165 may have embodiments that are sufficient for the types of ignition protection, for example with regard to distances and redundancies.

The monitoring of the electrical energy supply to the field devices 100 realized with the aid of the feed-in device 400 and the monitoring field devices 800 may also contribute to the intrinsic safety Ex ib of the input and output terminals 110, 111, 112. With respect to the output line terminals 165, the power limiting realized with the aid of the power limiting device 300 and barrier device 155 may contribute to the intrinsic safety Ex ia.

To achieve a high level of safety of the system 50, the field devices 100 may e.g. be further embodied with a cast encapsulation (protection type Ex mb). In this embodiment, the field devices 100 or their housing may be filled with a casting compound, which may prevent the penetration of an explosive mixture into the field devices 100. It is also possible to configure parts of the field devices 100 according to increased safety (protection class Ex eb). Another type of protection for the field devices 100 is also conceivable, e.g. a design with a pressure-proof encapsulation (type of protection Ex db).

Also, for the feed-in device 400 a cast encapsulation (protection type Ex mb) or a pressure-proof encapsulation (protection type Ex db), and a partial embodiment according to increased safety (protection type Ex eb) may be considered.

The field components 600 may be intrinsically safe field components, and may be configured according to the intrinsic safety Ex ia type of protection.

In addition to the embodiments described above and illustrated in the figures, further embodiments are conceivable, which may comprise further variations and/or combinations of features.

With reference to terminals shown in the figures, such as input terminals 110 and output terminals 111, 112 of field devices 100 and feed-in device output terminal 420 of feed-in device 400, it is possible that these terminals comprise an additional ground contact in addition to two terminal contacts 115, 116, 117, 421.

Instead of Zener diodes 321, other components or semiconductor components suitable for voltage limiting, such as thyristors, may be used in a forwarding limiting device 305 (cf. FIG. 8). The same applies, for example, to the power limiting device 300 of the field devices 100 and to the feed-in device limiting device 403 of the feed-in device 400.

With regard to the decoupling device 200 shown in FIG. 7, it is possible to replace the diodes 211 of the further assembly 210 and/or the clamping circuit 220 with other components or semiconductor components.

With respect to monitoring field devices 800 having a plurality of output terminals 111, 112, as illustrated in FIGS. 10 and 11, modified designs may be contemplated in which the monitoring field devices 800 comprise only one monitoring device 810. Here, the monitoring device 810 in question may be associated with the plurality of output terminals 111, 112 and connected to the plurality of output terminals 111, 112. In a corresponding manner, the monitoring device 810 may be used to monitor a plurality of system sections of the system 50.

For field devices 100 which cannot be used for monitoring the energy supply and which do not have a monitoring device 810, an embodiment with (at least) one further output terminal 112 may be considered, comparable to the embodiment shown in FIG. 10. In this context, the further output terminal 112 and a further switching device 181 may be connected to the input terminal 110 via internal electrical conductors 171.

It is also possible to have an embodiment of a field device 100 that cannot be used for monitoring without any output terminal 111, as a result of which further components such as the switching device 180, the second communication terminal 121, the second barrier circuit 141, and the second physical interface 146 may be omitted, and data communication may be carried out only via the input terminal 110 or the communication terminal 120. A field device 100 having such an embodiment may serve as a terminal device, and may be used, for example, at the end of a series or string of field devices 100 to pass on energy supplied to the field device 100 only to field components 600, and to carry out data communication via the field device 100 with the field components 600.

For field devices 100 having one or a plurality of switching devices 180, 181 as shown in FIGS. 4, 5, 9, 10, and 11, a possible modification is to configure them without switching devices 180, 181.

With regard to the feed-in device 400, it is also possible to arrange it in zone 1/21 according to the ATEX directive (second area 11 in FIG. 2) in deviation from FIG. 2. The feed-in device 400 may be configured to correspond to this. Furthermore, measures such as the use of an explosion-proof plug connector on a supply line used for connection to the current supply input 401 of the feed-in device 400 may be used, via which the feed-in device 400 may be connected to a current source. Also, the current supply input 401 may be configured according to the protection type Ex db or Ex eb.

In a further embodiment, the electrical energy provided by the feed-in device 400, which may be transported from or between the field devices 100 and forwarded to the field components 600, is an alternating current. In this context, components of the system 50 such as the feed-in device 400 and the field devices 100, as well as components or circuitry components thereof, may be configured to be coordinated therewith. Furthermore, the feed-in device 400 may be electrically connected to an AC source via its current supply input 401.

The data communication between the field devices 100, as well as the data communication between the feed-in device 400 and a field device 100 and with the superordinate controller 700, may be carried out in electrical form. It is also possible to carry out optical data communication, according to which optical data signals are transmitted and exchanged using optical fibers or fiber-based data lines.

In order to carry out optical data communication, the following variations may be considered for the field devices 100 shown in FIGS. 4, 5, 9, 10, and 11. The barrier circuits 140, 141, 142 may be omitted, and instead an optical transceiver may be arranged between each of the physical interfaces 145, 146, 147 and the associated input and output terminals 110, 111, 112 and communication terminals 120, 121, 122, respectively. In this embodiment, each of the barrier circuits 140, 141, 142 may be replaced by an optical transceiver. Here, the communication terminals 120, 121, 122 may each be connected to the communication controller 150 via an optical transceiver and a corresponding physical interface 145, 146, 147. The optical transceivers may be configured to convert optical data signals into electrical data signals and electrical data signals into optical data signals. In this context, the conversion to electrical data signals refers to receiving, and the conversion to optical data signals refers to transmitting data signals via the corresponding communication terminal 120, 121, 122.

With reference to the feed-in device 400 shown in FIG. 3, the following modification may be considered to provide optical data communication. The feed-in device barrier circuit 430 may be omitted, and an optical feed-in device transceiver may be disposed between the second physical feed-in device interface 446 and the feed-in device communication terminal 425. Here, the feed-in device barrier circuit 430 may be replaced by the optical feed-in device transceiver, and the feed-in device communication terminal 425 may be connected to the feed-in device communication controller 450 via the optical feed-in device transceiver and the second physical feed-in device interface 446. The feed-in device 400 may further comprise a further optical feed-in device transceiver, which may be disposed between the first physical feed-in device interface 445 and the communications input 405, so that the communication input 405 may be connected to the feed-in device communication controller 450 via the further optical feed-in device transceiver and the first physical feed-in device interface 445. The optical feed-in device transceivers may be configured to convert optical data signals to electrical data signals, and electrical data signals to optical data signals. In this context, conversion to electrical data signals refers to receiving, and conversion to optical data signals refers to transmitting data signals via the corresponding feed-in device communication terminal 425 or communication input 405.

It may also be possible to carry out data communication between the field devices 100 and the field components 600 in optical form. In this context, the field devices 100 or their terminal devices 160 may comprise corresponding optical transceivers for converting optical data signals into electrical data signals and electrical data signals into optical data signals. The same applies to the field components 600.

With respect to carry outing optical data communication, data lines used or supply lines 500 configured as hybrid lines and output lines 510 may comprise one or a plurality of optical fibers for data transmission.

For the feed-in device 400, a design is further conceivable in which the feed-in device 400 comprise a plurality of feed-in device output terminals 420 in a manner different from FIG. 3. In this way, the feed-in device 400 may be connected to a plurality of field devices 100 using a plurality of supply lines 500 connected to the feed-in device output terminals 420. In such an embodiment, the feed-in device 400 may be used as a distributor for electrical energy supply and also for data communication. In this regard, a system 50 may be constructed in which a plurality of rows or strings of field devices 100 may originate from the feed-in device 400. Correspondingly, the feed-in device 400 may comprise a plurality of feed-in device monitoring devices 410 associated with and connected to the respective feed-in device output terminals 420, with the aid of which the electrical energy supply of field devices 100 of the different strings, and thus a plurality of system sections of the system 50 emanating from the feed-in device, may be separately monitored. It is also possible to have an embodiment of the feed-in device 400 with only one feed-in device monitoring device 410 associated with and connected to the plurality of feed-in device output terminals 420, so that a plurality of system sections of the system 50 may be monitored using the feed-in device monitoring device 410.

In the field devices 100 described above and shown in FIGS. 1, 4, 5, 9, 10 and 11, data communication between the field devices 100 and with one another, and with the feed-in device 400, is implemented in the form of a point-to-point connection. The field devices 100 and the feed-in device 400 may also be implemented in such a way that data communication may take place via a bus structure.

In a further embodiment, the field devices 100 and the feed-in device 400 may be configured in such a way that the electrical energy supply and data communication are not carried out using hybrid lines and hybrid terminals, but instead are carried out using separate supply lines and data lines, and separate connections for the energy supply and data communication.

In an embodiment of a system 50 having a plurality of monitoring field devices 800, the monitoring field devices 800 may be configured to correspond to one another. A system 50 may further be configured with monitoring field devices 800 having different designs, e.g. designs corresponding to FIGS. 5 and 10.

Furthermore, reference is made to the possibility of implementing a system 50 comprising a feed-in device 400 and a plurality of field devices 100, in which all field devices 100 are monitoring field devices 800 configured to monitor the electrical energy supply, and thus all field devices 100 comprise (at least) one output terminal 111, 112 and (at least) one monitoring device 810, 819.

Although the invention has been further illustrated and described in detail by preferred embodiments, the invention is not limited by the disclosed examples and other variations may be derived therefrom by those skilled in the art without departing from the protective scope of the invention.

TABLE 1

List of reference numerals 10-310

| |
|---|
| 10 first area |
| 11 second area |
| 12 third area |
| 50 system |
| 100 field device |
| 101 first device section |
| 102 second device section |
| 110 input terminal |

TABLE 1-continued

List of reference numerals 10-310

| |
|---|
| 111 output terminal |
| 112 further output terminal |
| 115 terminal contact |
| 116 terminal contact |
| 117 terminal contact |
| 120 first communication terminal |
| 121 second communication terminal |
| 122 further communication terminal |
| 131 separating device |
| 132 internal power supply device |
| 140 first barrier circuit |
| 141 second barrier circuit |
| 142 further barrier circuit |
| 145 first physical interface |
| 146 second physical interface |
| 147 further physical interface |
| 150 communication controller |
| 155 barrier device |
| 160 terminal device |
| 161 input/output controller |
| 165 output line terminal |
| 170 energy supply connection |
| 171 internal conductor |
| 175 communication connection |
| 180 switching device |
| 181 further switching device |
| 200 decoupling device |
| 210 further assembly |
| 211 diode |
| 220 clamping circuit |
| 230 inductor |
| 240 capacitive assembly |
| 241 capacitor |
| 250 inrush current limiter |
| 300 power limiting device |
| 305 forwarding limiting device |
| 309 further forwarding limiting device |
| 310 protective device |

TABLE 2

List of reference numerals 311-823

| | |
|---|---|
| 311 current limiting device | 430 feed-in device barrier circuit |
| 315 resistor | 445 first physical feed-in device interface |
| 316 fuse | 446 second physical feed-in device interface |
| 317 protective resistor | 450 feed-in device communication controller |
| 320 voltage limiting device | 471 internal conductor |
| 321 Zener diode | 476 internal data line |
| 400 feed-in device | 500 supply line |
| 401 current supply input | 510 output line |
| 403 feed-in device limiting device | 600 field component |
| 405 communication input | 700 controller |
| 410 feed-in device monitoring device | 800 monitoring field device |
| 411 first feed-in device detector | 810 monitoring device |
| 412 second feed-in device detector | 811 first detector |
| 413 feed-in device switching device | 812 second detector |
| 414 feed-in device control unit | 813 switching unit |
| 415 feed-in device detector device | 814 control unit |
| 420 feed-in device output terminal | 815 detector device |
| 421 terminal contact | 819 further monitoring device |
| 425 feed-in device communication terminal | 821 first system section |
| 430 feed-in device barrier circuit | 822 second system section |
| 445 first physical feed-in device interface | 823 further system section |

The invention claimed is:

1. A system comprising a feed-in device and a plurality of field devices electrically connected to the feed-in device, wherein:

the feed-in device is configured to provide electrical energy for electrical energy supply to the plurality of field devices, wherein the feed-in device comprises a feed-in device monitoring device configured to detect spark generation in the electrical energy supply and, based on detecting said spark generation, to switch off the electrical energy supply, wherein each of the plurality of field devices comprises an input terminal for connecting a supply line, configured for the electrical energy provided by the feed-in device to be supplied to the respective field device, wherein at least one of the plurality of field devices is a monitoring field device configured for electrical energy supply to at least one subsequent field device of the plurality of field devices, and comprises the following:

at least one output terminal for connecting a further supply line, configured for the electrical energy to be forwarded for the electrical energy supply to the at least one subsequent field device; and a monitoring device configured to detect the spark generation in the electrical energy supply to the at least one subsequent field device and, based on detecting said spark generation, to switch off the electrical energy supply to the at least one subsequent field device, wherein each of the plurality of field devices, including the at least one monitoring field device, comprises a decoupling device configured to provide a predetermined input impedance for detecting the spark generation, wherein the decoupling device of each of the plurality of field devices is connected to the input terminal of the respective field device and is arranged downstream thereof, wherein during operation of the system, different system sections of the system are monitored with the feed-in device and the at least one monitoring field device with regard to detecting the spark generation, wherein the decoupling device of the at least one monitoring field device is arranged upstream of the monitoring device of the respective monitoring field device and serves as a termination impedance of a system section of the system which is monitored by the feed-in device or by a further monitoring field device arranged upstream of the respective monitoring field device; and wherein the decoupling device of the at least one monitoring field device is configured for components or circuit components arranged downstream of the respective decoupling device to have no substantial influence on monitoring of the system section by the feed-in device or the further monitoring field device arranged upstream of the respective monitoring field device.

2. The system according to claim 1, wherein:

each of the plurality of field devices is configured to carry out data communication, and each of the plurality of field devices comprises at least one communication terminal configured for connecting a data line for receiving and/or transmitting data signals and a communication controller connected to the at least one communication terminal.

3. The system according to claim 1, wherein the decoupling device comprises an LC low-pass filter having an inductor and at least one capacitor.

4. The system according to claim 1, wherein at least one of the plurality of field devices comprises a terminal device for connecting at least one output line, configured for the electrical energy to be forwarded for electrical energy supply to at least one field component.

5. The system according to claim 4, wherein:

each of the plurality of field devices is configured to carry out data communication, each of the plurality of field devices comprises at least one communication terminal configured for connecting a data line for receiving and/or transmitting data signals and a communication controller connected to the at least one communication terminal, and in the at least one field device comprising the terminal device, the communication controller is connected to the terminal device via a communication connection configured to receive and/or transmit the data signals via the terminal device.

6. The system according to claim 4, wherein;

the at least one field device comprising the terminal device comprises a first device section and a second device section, wherein the first device section comprises the input terminal and the second device section comprises the terminal device, wherein the electrical energy provided by the feed-in device is available to be supplied to the first device section via the input terminal, to be transmitted from the first device section to the second device section via an electrical energy supply connection, and to be forwarded via the terminal device, and wherein the electrical energy supply connection of the first and second device sections comprises a power limiting device configured for limiting an electrical power transmittable from the first device section to the second device section.

7. The system according to claim 1, wherein the monitoring device of the at least one monitoring field device comprises:

a detector device configured for detecting a current change during the spark generation in the electrical energy supply to the at least one subsequent field device, a control unit; and a switching unit;

wherein the control unit is configured for switching off the energy supply to the at least one subsequent field device by actuating the switching unit based on the current change detected with the detector device.

8. The system according to claim 1, wherein the at least one monitoring field device comprises a forwarding limiting device configured to limit an electrical power transmittable during forwarding of the electrical energy to the at least one subsequent field device via the at least one output terminal.

9. The system according to claim 7, wherein the at least one monitoring field device comprises a switching device in addition to the switching unit of the monitoring device, wherein forwarding of the electrical energy to the at least one subsequent field device via the at least one output terminal is switchable via the switching device.

10. The system according to claim 1, wherein each of the plurality of field devices comprises an inrush current limiter configured to limit an inrush current at a start of the electrical energy supply provided by the feed-in device.

11. A system comprising a feed-in device and a plurality of field devices electrically connected to the feed-in device, wherein:
the feed-in device is configured to provide electrical energy for electrical energy supply to the plurality of field devices,
wherein the feed-in device comprises a feed-in device monitoring device configured to detect spark generation in the electrical energy supply and, based on detecting said spark generation, to switch off the electrical energy supply,
wherein each of the plurality of field devices comprises an input terminal for connecting a supply line, configured for the electrical energy provided by the feed-in device to be supplied to the respective field device,
wherein at least one of the plurality of field devices comprises a terminal device for connecting at least one output line, configured for the electrical energy to be forwarded for electrical energy supply to at least one field component,
wherein at least one of the plurality of field devices is a monitoring field device configured for electrical energy supply to at least one subsequent field device of the plurality of field devices, and comprises the following:
at least one output terminal for connecting a further supply line, configured for the electrical energy to be forwarded for the electrical energy supply to that at least one subsequent field device; and
a monitoring device configured to detect the spark generation in the electrical energy supply to the at least one subsequent field device and, based on detecting said spark generation, to switch off the electrical energy supply to the at least one subsequent field device,
wherein each of the plurality of field devices, including the at least one monitoring field device, comprises a decoupling device configured to provide a predetermined input impedance for detecting the spark generation,
wherein the decoupling device comprises an LC low-pass filter having an inductor and at least one capacitor,
wherein the decoupling device of each of the plurality of field devices is connected to the input terminal of the respective field device and is arranged downstream thereof,
wherein during operation of the system, different system sections of the system are monitored with the feed-in device and the at least one monitoring field device with regard to detecting the spark generation,
and wherein the decoupling device of the at least one monitoring field device is arranged upstream of the monitoring device of the respective monitoring field device and serves as a termination impedance of a system section of the system which is monitored by the feed-in device or by a further monitoring field device arranged upstream of the respective monitoring field device.

12. The system according to claim 11, wherein the LC low-pass filter comprises two capacitors connected in parallel.

13. The system according to claim 11, wherein the decoupling device comprises a voltage limiting device connected in parallel with the inductor, wherein the voltage limiting device is realized as clamping circuit comprising two strings of serially connected diodes, and wherein the strings are connected in parallel.

14. The system according to claim 11, wherein the at least one field component is a sensor or an actuator.

15. A system comprising a feed-in device and a plurality of field devices electrically connected to the feed-in device,
wherein the feed-in device is configured to provide electrical energy for electrical energy supply to the plurality of field devices,
wherein the feed-in device comprises a feed-in device monitoring device configured to detect spark generation in the electrical energy supply and, based on detecting said spark generation, to switch off the electrical energy supply,
wherein each of the plurality of field devices comprises an input terminal for connecting a supply line, configured for the electrical energy provided by the feed-in device to be supplied to the respective field device,
wherein at least one of the plurality of field devices is a monitoring field device configured for electrical energy supply to at least one subsequent field device of the plurality of field devices, and comprises the following:
at least one output terminal for connecting a further supply line, configured for the electrical energy to be forwarded for the electrical energy supply to the at least one subsequent field device; and
a monitoring device configured to detect the spark generation in the electrical energy supply to the at least one subsequent field device and, based on detecting said spark generation, to switch off the electrical energy supply to the at least one subsequent field device,
wherein each of the plurality of field devices, including the at least one monitoring field device, comprises a decoupling device configured to provide a predetermined input impedance for detecting the spark generation,
wherein the decoupling device of each of the plurality of field devices is connected to the input terminal of the respective field device and is arranged downstream thereof,
wherein during operation of the system, different system sections of the system are monitored with the feed-in device and the at least one monitoring field device with regard to detecting the spark generation,
wherein the decoupling device of the at least one monitoring field device is arranged upstream of the monitoring device of the respective monitoring field device and serves as a termination impedance of a system section of the system which is monitored by the feed-in device or by a further monitoring field device arranged upstream of the respective monitoring field device,
wherein the decoupling device of the at least one monitoring field device is configured for components or circuit components arranged downstream of the respective decoupling device to have no substantial influence on the monitoring of the system section by the feed-in device or the further monitoring field device arranged upstream of the respective monitoring field device,
wherein the monitoring device of the at least one monitoring field device comprises:
a detector device configured for detecting a current change during the spark generation in the electrical energy supply to the at least one subsequent field device;
a control unit; and
a switching unit,
wherein the control unit is configured for switching off the energy supply to the at least one subsequent field device by actuating the switching unit based on the current change detected with the detector device, wherein the at least one monitoring field device comprises a switching device in addition to the switching unit of the monitoring device, and wherein forwarding of the electrical energy to the at least one subsequent field device via the at least one output terminal is switchable via the switching device.

16. The system according to claim 15, wherein the switching device of the at least one monitoring field device is arranged between the input terminal and the monitoring device of the respective monitoring field device.

\* \* \* \* \*